(12) United States Patent
Miyazaki

(10) Patent No.: US 8,593,947 B2
(45) Date of Patent: Nov. 26, 2013

(54) CONGESTION DETECTION METHOD, CONGESTION DETECTION APPARATUS, AND RECORDING MEDIUM STORING CONGESTION DETECTION PROGRAM RECORDED THEREON

(75) Inventor: Hideaki Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 12/410,099

(22) Filed: Mar. 24, 2009

(65) Prior Publication Data

US 2009/0245103 A1  Oct. 1, 2009

(30) Foreign Application Priority Data

Mar. 25, 2008  (JP) ................. 2008-076954

(51) Int. Cl.
*G01R 31/08* (2006.01)
(52) U.S. Cl.
USPC .......................... 370/229; 370/235
(58) Field of Classification Search
None
See application file for complete search history.

(56) References Cited

U.S. PATENT DOCUMENTS

| 6,178,450 | B1 | 1/2001 | Ogishi et al. | |
|---|---|---|---|---|
| 7,567,513 | B2 * | 7/2009 | Cho | 370/235 |
| 7,788,568 | B1 * | 8/2010 | Huang et al. | 714/774 |
| 2006/0083168 | A1 * | 4/2006 | Prakash | 370/230 |
| 2007/0019564 | A1 * | 1/2007 | Park | 370/252 |
| 2007/0177502 | A1 | 8/2007 | Hama | |
| 2009/0003210 | A1 * | 1/2009 | Jakobsen et al. | 370/235 |

FOREIGN PATENT DOCUMENTS

| JP | 11-027308 | 1/1999 |
|---|---|---|
| JP | 2000-151707 | 5/2000 |
| JP | 2005-110038 | 5/2005 |
| JP | 3953999 | 5/2007 |
| JP | 2007-208571 | 8/2007 |

OTHER PUBLICATIONS

"Measurement and Modelling of the Temporal Dependence in Packet Loss", 1999 IEEE.*

* cited by examiner

*Primary Examiner* — Kibrom T Hailu
(74) *Attorney, Agent, or Firm* — Staas & Halsey LLP

(57) ABSTRACT

According to an aspect of the embodiments, a congestion detection method causes a computer to function as a congestion detection apparatus connectable to a network. Packets on the network are obtained and a packet loss is detected. A packet group made up of a series of packets based on the obtained packets is extracted. A packet loss in the packet group is detected and a position in the packet group where the packet loss occurred is detected. Whether congestion is occurring is judged based on the position of the packet loss in the packet group.

13 Claims, 33 Drawing Sheets

FIG. 5

| IP HEADER | | | | | |
|---|---|---|---|---|---|
| VERSION | HEADER LENGTH | SERVICE TYPE | PACKET LENGTH | | |
| IDENTIFIER | | | FLAG | FRAGMENT OFFSET | |
| LIFETIME | | PROTOCOL | HEADER CHECKSUM | | |
| SOURCE IP ADDRESS | | | | | |
| DESTINATION IP ADDRESS | | | | | |
| OPTION | | | | | PADDING |

FIG. 6

| PACKET NO. | SOURCE IP ADDRESS | IDENTIFIER | FLAG | FRAGMENT OFFSET | PACKET LENGTH (BYTES) | TIME |
|---|---|---|---|---|---|---|
| ... | ... | ... | ... | ... | ... | ... |
| P0 | 10.10.10.10 | 50 | no more fragment | 5500 | 1000 | t0 |
| P1 | 10.10.10.10 | 100 | more fragment | 0 | 1500 | t1 |
| P2 | 10.10.10.10 | 100 | more fragment | 1500 | 1500 | t2 |
| P3 | 10.10.10.10 | 100 | more fragment | 3000 | 1500 | t3 |
| P4 | 10.10.10.10 | 100 | more fragment | 4500 | 1500 | t4 |
| P5 | 10.10.10.10 | 100 | more fragment | 6000 | 1500 | t5 |
| P6 | 10.10.10.10 | 100 | more fragment | 7500 | 1500 | t6 |
| P7 | 10.10.10.10 | 100 | more fragment | 9000 | 1500 | t7 |
| P10 | 10.10.10.10 | 100 | no more fragment | 13500 | 500 | t10 |
| P11 | 10.10.10.10 | 200 | more fragment | 0 | 1500 | t11 |
| P12 | 10.10.10.10 | 200 | more fragment | 1500 | 1500 | t12 |
| P20 | 10.10.10.12 | 300 | no more fragment | 6000 | 500 | t20 |
| P21 | 20.20.20.20 | 400 | more fragment | 0 | 1500 | t21 |
| ... | ... | ... | ... | ... | ... | ... |

ONE PACKET GROUP G (P1–P10)

FIG. 8

| PACKET NO. | SOURCE IP ADDRESS: PORT NUMBER | TIMESTAMP | SEQUENCE NUMBER | PACKET LENGTH (BYTES) | TIME |
|---|---|---|---|---|---|
| ... | ... | ... | ... | ... | ... |
| P0 | 10.10.10.10:1000 | 50 | S0 | 1000 | t0 |
| P1 | 10.10.10.10:1000 | 100 | S1 | 1500 | t1 |
| P2 | 10.10.10.10:1000 | 100 | S2 | 1500 | t2 |
| P3 | 10.10.10.10:1000 | 100 | S3 | 1500 | t3 |
| P4 | 10.10.10.10:1000 | 100 | S4 | 1500 | t4 |
| P5 | 10.10.10.10:1000 | 100 | S5 | 1500 | t5 |
| P6 | 10.10.10.10:1000 | 100 | S6 | 1500 | t6 |
| P7 | 10.10.10.10:1000 | 100 | S7 | 1500 | t7 |
| P10 | 10.10.10.10:1000 | 100 | S10 | 500 | t10 |
| P11 | 10.10.10.10:1000 | 200 | S11 | 1500 | t11 |
| P12 | 10.10.10.10:1000 | 200 | S12 | 1500 | t12 |
| P20 | 10.10.10.20:1001 | 300 | S20 | 500 | t20 |
| P21 | 20.20.20.20:1000 | 400 | S21 | 1500 | t21 |
| ... | ... | ... | ... | ... | ... |

ONE PACKET GROUP G (P1–P10)

FIG. 9

TCP HADER

| SOURCE PORT NUMBER | DESTINATION PORT NUMBER |
|---|---|
| SEQUENCE NUMBER ||
| ACK NUMBER ||

| DATA OFFSET | RESERVATION | CODE BIT | WINDOW SIZE |
|---|---|---|---|

| CHECKSUM | EMERGENCY POINTER |
|---|---|
| OPTION | PADDING |

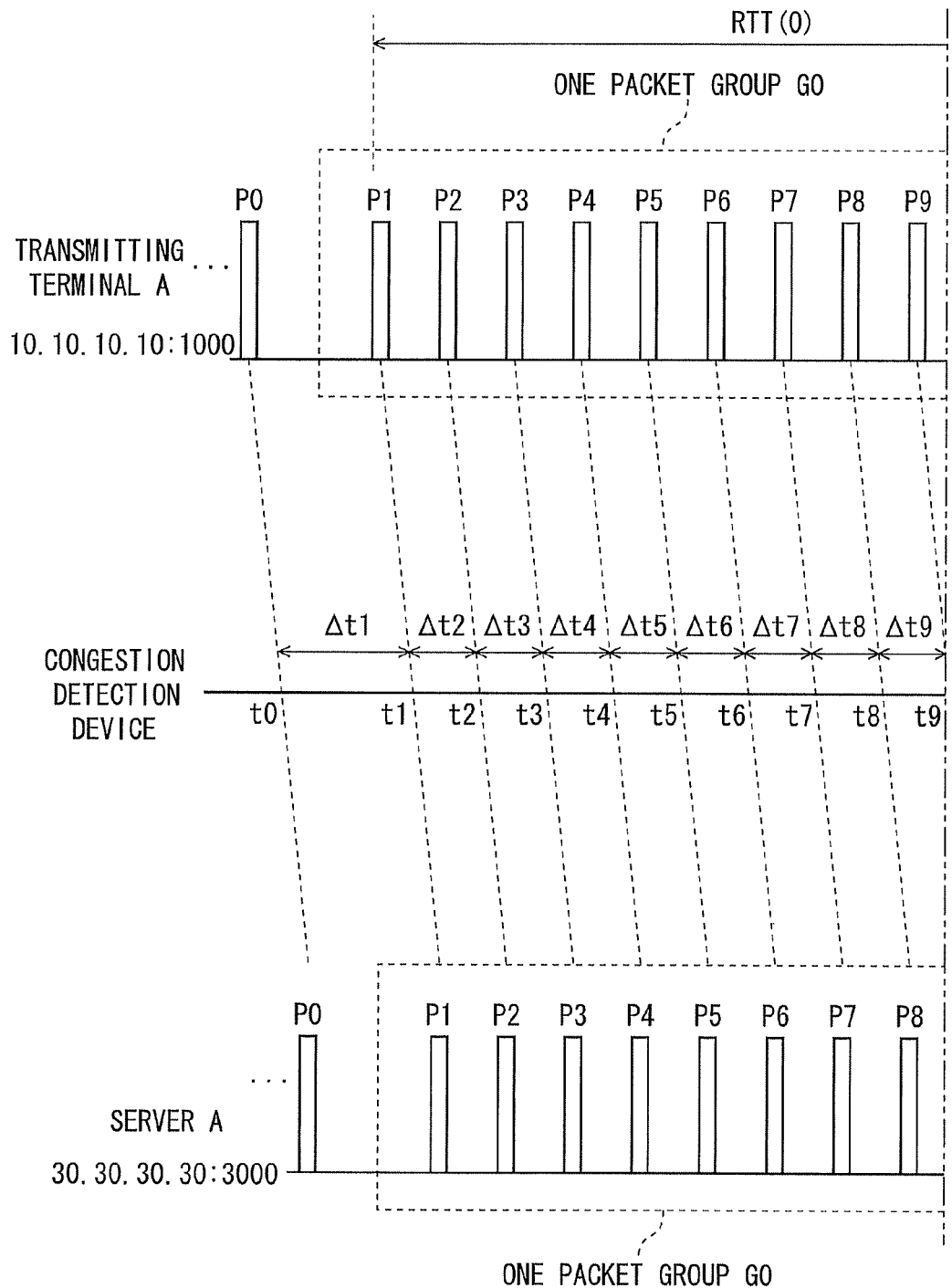

FIG. 11

| FIG. 11A |
|----------|
| FIG. 11B |

FIG. 11A

| PACKET NO. | SOURCE IP ADDRESS: PORT NUMBER | DESTINATION IP ADDRESS: PORT NUMBER | SEQUENCE NUMBER | TIME | PACKET INTERVAL |
|---|---|---|---|---|---|
| P0 | 10.10.10.10:1000 | 30.30.30.30:3000 | S0 | t0 | — |
| P1 | 10.10.10.10:1000 | 30.30.30.30:3000 | S1 | t1 | Δt1=t1−t0=5.0ms |
| P2 | 10.10.10.10:1000 | 30.30.30.30:3000 | S2 | t2 | Δt2=t2−t1=1.2ms |
| P3 | 10.10.10.10:1000 | 30.30.30.30:3000 | S3 | t3 | Δt3=t3−t2=1.2ms |
| P4 | 10.10.10.10:1000 | 30.30.30.30:3000 | S4 | t4 | Δt4=t4−t3=1.2ms |
| P5 | 10.10.10.10:1000 | 30.30.30.30:3000 | S5 | t5 | Δt5=t5−t4=1.2ms |
| P6 | 10.10.10.10:1000 | 30.30.30.30:3000 | S6 | t6 | Δt6=t6−t5=1.2ms |
| P7 | 10.10.10.10:1000 | 30.30.30.30:3000 | S7 | t7 | Δt7=t7−t6=1.2ms |
| P8 | 10.10.10.10:1000 | 30.30.30.30:3000 | S8 | t8 | Δt8=t8−t7=1.2ms |
| P9 | 10.10.10.10:1000 | 30.30.30.30:3000 | S9 | t9 | Δt9=t9−t5=1.2ms |
| P10 | 10.10.10.10:1000 | 30.30.30.30:3000 | S10 | t10 | Δt10=t10−t9=10.0ms |
| P11 | 10.10.10.10:1000 | 30.30.30.30:3000 | S11 | t11 | Δt11=t11−t10=1.2ms |
| P12 | 10.10.10.10:1000 | 30.30.30.30:3000 | S12 | t12 | Δt12=t12−t11=1.2ms |
| P13 | 10.10.10.10:1000 | 30.30.30.30:3000 | S13 | t13 | Δt13=t13−t12=1.2ms |
| P14 | 10.10.10.10:1000 | 30.30.30.30:3000 | S14 | t14 | Δt14=t14−t13=1.2ms |
| P15 | 10.10.10.10:1000 | 30.30.30.30:3000 | S15 | t15 | Δt15=t15−t14=1.2ms |
| P16 | 10.10.10.10:1000 | 30.30.30.30:3000 | S16 | t16 | Δt16=t16−t15=1.2ms |
| P19 | 10.10.10.10:1000 | 30.30.30.30:3000 | S19 | t17 | Δt17=t17−t16=8.0ms |

P0–P9: ONE PACKET GROUP G0
P10–P19: ONE PACKET GROUP G1

FIG. 11B

| | | | | | |
|---|---|---|---|---|---|
| RETRANSMISSION → | P20 | 10.10.10.10:1000 | 30.30.30.30:3000 | S20 | t18 | Δt18=t18−t17=7.0ms |
| | P17 | 10.10.10.10:1000 | 30.30.30.30:3000 | S17 | t19 | Δt19=t19−t18=1.2ms |
| | P21 | 10.10.10.10:1000 | 30.30.30.30:3000 | S21 | t20 | Δt20=t20−t19=1.4ms |
| RETRANSMISSION → | P22 | 10.10.10.10:1000 | 30.30.30.30:3000 | S22 | t21 | Δt21=t21−t20=1.2ms |
| | P18 | 10.10.10.10:1000 | 30.30.30.30:3000 | S18 | t22 | Δt22=t22−t21=2.0ms |
| | ... | | | ... | ... | ... |
| | P50 | 10.10.10.12:1001 | 30.30.30.31:3001 | S0 | t50 | − |
| | P51 | 10.10.10.12:1001 | 30.30.30.31:3001 | S1 | t51 | Δt51=t51−t50=12.0ms |
| | P52 | 10.10.10.12:1001 | 30.30.30.31:3001 | S3 | t52 | Δt52=t52−t51=12.0ms |
| | ... | | | ... | ... | ... |

FIG. 12

| SOURCE IP ADDRESS | AVERAGE PACKET INTERVAL | STANDARD DEVIATION OF PACKET INTERVALS |
|---|---|---|
| 10.10.10.10 | 1.2ms | 0.2ms |
| 10.10.10.12 | 12.0ms | 4.0ms |
| ⋮ | ⋮ | ⋮ |

*FIG. 13*

| SOURCE IP ADDRESS: PORT NUMBER | DESTINATION IP ADDRESS: PORT NUMBER | ACK NUMBER | COUNT |
|---|---|---|---|
| 10.10.10.10:1000 | 30.30.30.30:3000 | ACK0 | 1 |
| 10.10.10.10:1000 | 30.30.30.30:3000 | ACK1 | 1 |
| 10.10.10.10:1000 | 30.30.30.30:3000 | ACK2 | 1 |
| 10.10.10.10:1000 | 30.30.30.30:3000 | ACK3 | 1 |
| 10.10.10.10:1000 | 30.30.30.30:3000 | ACK4 | 1 |
| 10.10.10.10:1000 | 30.30.30.30:3000 | ACK5 | 1 |
| 10.10.10.10:1000 | 30.30.30.30:3000 | ACK6 | 1 |
| 10.10.10.10:1000 | 30.30.30.30:3000 | ACK7 | 1 |
| 10.10.10.10:1000 | 30.30.30.30:3000 | ACK8 | 1 |
| 10.10.10.10:1000 | 30.30.30.30:3000 | ACK9 | 1 |
| 10.10.10.10:1000 | 30.30.30.30:3000 | ACK10 | 1 |
| 10.10.10.10:1000 | 30.30.30.30:3000 | ACK11 | 1 |
| 10.10.10.10:1000 | 30.30.30.30:3000 | ACK12 | 1 |
| 10.10.10.10:1000 | 30.30.30.30:3000 | ACK13 | 1 |
| 10.10.10.10:1000 | 30.30.30.30:3000 | ACK14 | 1 |
| 10.10.10.10:1000 | 30.30.30.30:3000 | ACK15 | 1 |
| 10.10.10.10:1000 | 30.30.30.30:3000 | ACK16 | 3 |
| 10.10.10.10:1000 | 30.30.30.30:3000 | ACK17 | 3 |
| 10.10.10.10:1000 | 30.30.30.30:3000 | ACK22 | 1 |
| ⋮ | ⋮ | ⋮ | ⋮ |
| 10.10.10.12:1001 | 30.30.30.31:3001 | ACK0 | 1 |
| 10.10.10.12:1001 | 30.30.30.31:3001 | ACK1 | 1 |
| 10.10.10.12:1001 | 30.30.30.31:3001 | ACK2 | 1 |
| ⋮ | ⋮ | ⋮ | ⋮ |

FIG. 15A

| FIG. 15 | |
|---|---|
| FIG. 15A | |
| FIG. 15B | |

| PACKET NO. | SOURCE IP ADDRESS: PORT NUMBER | DESTINATION IP ADDRESS: PORT NUMBER | SEQUENCE NUMBER | TIME | PACKET INTERVAL |
|---|---|---|---|---|---|
| P0 | 10.10.10.10:1000 | 30.30.30.30:3000 | S0 | t0 | — |
| P1 | 10.10.10.10:1000 | 30.30.30.30:3000 | S1 | t1 | Δt1=t1−t0=5.0ms |
| P2 | 10.10.10.10:1000 | 30.30.30.30:3000 | S2 | t2 | Δt2=t2−t1=1.2ms |
| P3 | 10.10.10.10:1000 | 30.30.30.30:3000 | S3 | t3 | Δt3=t3−t2=1.2ms |
| P4 | 10.10.10.10:1000 | 30.30.30.30:3000 | S4 | t4 | Δt4=t4−t3=1.2ms |
| P5 | 10.10.10.10:1000 | 30.30.30.30:3000 | S5 | t5 | Δt5=t5−t4=1.2ms |
| P6 | 10.10.10.10:1000 | 30.30.30.30:3000 | S6 | t6 | Δt6=t6−t5=1.2ms |
| P7 | 10.10.10.10:1000 | 30.30.30.30:3000 | S7 | t7 | Δt7=t7−t6=1.2ms |
| P8 | 10.10.10.10:1000 | 30.30.30.30:3000 | S8 | t8 | Δt8=t8−t7=1.2ms |
| P9 | 10.10.10.10:1000 | 30.30.30.30:3000 | S9 | t9 | Δt9=t9−t5=1.2ms |
| P10 | 10.10.10.10:1000 | 30.30.30.30:3000 | S10 | t10 | Δt10=t10−t9=10.0ms |
| P11 | 10.10.10.10:1000 | 30.30.30.30:3000 | S11 | t11 | Δt11=t11−t10=1.2ms |
| P12 | 10.10.10.10:1000 | 30.30.30.30:3000 | S12 | t12 | Δt12=t12−t11=1.2ms |
| P13 | 10.10.10.10:1000 | 30.30.30.30:3000 | S13 | t13 | Δt13=t13−t12=1.2ms |
| P14 | 10.10.10.10:1000 | 30.30.30.30:3000 | S14 | t14 | Δt14=t14−t13=1.2ms |
| P15 | 10.10.10.10:1000 | 30.30.30.30:3000 | S15 | t15 | Δt15=t15−t14=1.2ms |
| P16 | 10.10.10.10:1000 | 30.30.30.30:3000 | S16 | t16 | Δt16=t16−t15=1.2ms |
| P17 | 10.10.10.10:1000 | 30.30.30.30:3000 | S17 | t17 | Δt17=t17−t16=1.2ms |
| P18 | 10.10.10.10:1000 | 30.30.30.30:3000 | S18 | t18 | Δt18=t18−t17=1.2ms |
| P19 | 10.10.10.10:1000 | 30.30.30.30:3000 | S19 | t19 | Δt19=t19−t18=1.2ms |

ONE PACKET GROUP G0: P0–P9
ONE PACKET GROUP G1: P10–P19

FIG. 15B

| | | | | | |
|---|---|---|---|---|---|
| RETRANSMISSION → | P20 | 10.10.10.10:1000 | 30.30.30.30:3000 | S20 | t20 | Δt20=t20−t19=7.0ms |
| | P17 | 10.10.10.10:1000 | 30.30.30.30:3000 | S17 | t21 | Δt21=t21−t20=1.2ms |
| | P21 | 10.10.10.10:1000 | 30.30.30.30:3000 | S21 | t22 | Δt22=t22−t21=1.4ms |
| RETRANSMISSION → | P22 | 10.10.10.10:1000 | 30.30.30.30:3000 | S22 | t23 | Δt23=t23−t22=1.2ms |
| | P18 | 10.10.10.10:1000 | 30.30.30.30:3000 | S18 | t24 | Δt24=t24−t23=2.0ms |
| | ... | | | ... | ... | ... |
| | P50 | 10.10.10.12:1001 | 30.30.30.31:3001 | S1 | t50 | − |
| | P51 | 10.10.10.12:1001 | 30.30.30.31:3001 | S2 | t51 | Δt51=t51−t50=12.0ms |
| | P52 | 10.10.10.12:1001 | 30.30.30.31:3001 | S3 | t52 | Δt52=t52−t51=12.0ms |
| | ... | | | ... | ... | ... |

FIG. 20A

| SOURCE IP ADDRESS | PACKET GROUP NO. | CONSECUTIVE TRANSMISSION | LOSS | SEQUENCE NUMBER OF LOST PACKET | CONGESTION JUDGMENT |
|---|---|---|---|---|---|
| 10.10.10.10 | G1 | 10 | 2 | S17<br>S18 | CONGESTION |
| | G6 | 10 | 3 | S55<br>S56<br>S58 | CONGESTION |
| | G9 | 8 | 2 | S74<br>S75 | NO CONGESTION |
| | G17 | 16 | 3 | S175<br>S178<br>S179 | CONGESTION |
| | ⋮ | ⋮ | ⋮ | ⋮ | ⋮ |
| 10.10.10.11 | ⋮ | ⋮ | ⋮ | ⋮ | ⋮ |
| 10.10.10.11 | ⋮ | ⋮ | ⋮ | ⋮ | ⋮ |
| ⋮ | ⋮ | ⋮ | ⋮ | ⋮ | ⋮ |

FIG. 20B

| DESTINATION IP ADDRESS | PACKET GROUP NO. | CONSECUTIVE TRANSMISSION | LOSS | SEQUENCE NUMBER OF LOST PACKET | CONGESTION JUDGMENT |
|---|---|---|---|---|---|
| 20.20.20.20 | G4 | 8 | 2 | S39 | CONGESTION |
| | | | | S40 | |
| | G10 | 8 | 2 | S82 | NO CONGESTION |
| | | | | S83 | |
| | ⋮ | ⋮ | ⋮ | ⋮ | ⋮ |
| 20.20.20.21 | ⋮ | ⋮ | ⋮ | ⋮ | ⋮ |

FIG. 21

| SOURCE IP ADDRESS | TOTAL NUMBER OF OBTAINED PACKETS | TOTAL NUMBER OF LOSSES | LOSSES IN POSTERIOR PORTION | CONGESTION JUDGMENT |
|---|---|---|---|---|
| 10.10.10.11 | 100 | 5 | 4 | CONGESTION |
| 10.10.10.12 | 200 | 10 | 10 | CONGESTION |
| 10.10.10.13 | 150 | 6 | 5 | CONGESTION |
| 10.10.10.14 | 0 | 0 | 0 | – |
| 20.20.20.21 | 100 | 0 | 0 | – |
| 20.20.20.22 | 300 | 0 | 0 | – |
| 20.20.20.23 | 200 | 0 | 0 | – |

CONGESTION DETECTION METHOD, CONGESTION DETECTION APPARATUS, AND RECORDING MEDIUM STORING CONGESTION DETECTION PROGRAM RECORDED THEREON

CROSS-REFERENCE TO RELATED APPLICATIONS

This application is based upon and claims the benefit of priority of Japanese Patent Application No. 2008-76954 filed on Mar. 25, 2008, the entire contents of which are incorporated herein by reference.

FIELD

The embodiments discussed herein are related to a congestion detection method, congestion detection apparatus, and recording medium storing a congestion detection program for detecting congestion.

BACKGROUND

For stable operation of network services, it is required to detect causes of network failures. One of network failures is congestion of data. The congestion of data refers to a condition in which discarding of traffic, for example, takes place as a result of influx of a larger quantity of traffic than a quantity of traffic with which the network can treat. One method for detecting such congestion of data is to transmit a measurement packet such as Ping onto the network. Presence or absence of congestion of packets on the network is detected by transmitting a measurement packet to terminals and analyzing responses to the measurement packet, e.g., whether responses are sent back from the terminals or a response time from the terminals.

Japanese Patent Laid-Open No. 2007-208571 discusses a method for determining the presence/absence of congestion and/or the level of congestion, such as severe or mild congestion, based on the fact that packets are discarded when congestion has occurred. For example, the method analyzes the number of packet losses and/or the number of packet loss occurrences in segments with packet losses to determine the level of congestion.

SUMMARY

According to an aspect of the embodiments, a congestion detection method for causing a computer to function as a congestion detection apparatus connectable to a network, the method includes the operations of: obtaining packets on the network; extracting a packet group made up of a series of packets based on the obtained packets; detecting a packet loss in the packet group and locating a position in the packet group where the packet loss is occurring; and judging whether congestion is occurring or not based on the position of the packet loss in the packet group. According to an aspect of an embodiment, packet loss detection and packet group extraction can be performed in any order.

Other aspects and advantages of the embodiments of the invention discussed herein will be realized and attained by referring to the elements and combinations particularly described with reference to the accompanying drawings, wherein like numerals refer to like parts throughout, and forming a part hereof, and as pointed out in the claims.

It is to be understood that both the foregoing general description and the following detailed and the following detailed description are exemplary and only are not restrictive of the invention, as claimed.

BRIEF DESCRIPTION OF THE DRAWINGS

FIG. 5 illustrates an example of an exemplary structure of an IP header;

FIG. 6 illustrates an example of packet information stored in a packet information DB;

FIG. 8 illustrates an example of packet information stored in the packet information DB;

FIG. 9 illustrates an example of an exemplary structure of a TCP header;

FIGS. 10A-10C (FIG. 10A-10C are connected in successive order as illustrated in a right upper part of FIG. 10A) illustrate an example of a case where TCP packets are lost before reaching a congestion detection apparatus;

FIGS. 11A-11B (FIG. 11A-11B represent a packet information table connected in order of packet No. as illustrated in a right upper part of FIG. 11A) illustrate a first example of packet information stored in the packet information DB for packets that contain data;

FIG. 12 illustrates a second example of packet information stored in the packet information DB for packets that contain data;

FIG. 13 illustrates an example of packet information stored in the packet information DB 43 for ACK packets;

FIGS. 15A-15B (FIG. 15A-15B represent a packet information table connected in order of packet No. as illustrated in a right upper part of FIG. 15A) illustrate an example of packet information stored in the packet information DB for packets that contain data;

FIG. 20A illustrates an example of result of congestion judgment performed by a congestion judging part;

FIG. 20B illustrates another example of result of congestion judgment performed by a congestion judging part;

FIG. 21 illustrates an example of compilation results of congestion judgment;

DESCRIPTION OF EMBODIMENTS

First Embodiment (1) Overall Configuration

Figure 1:
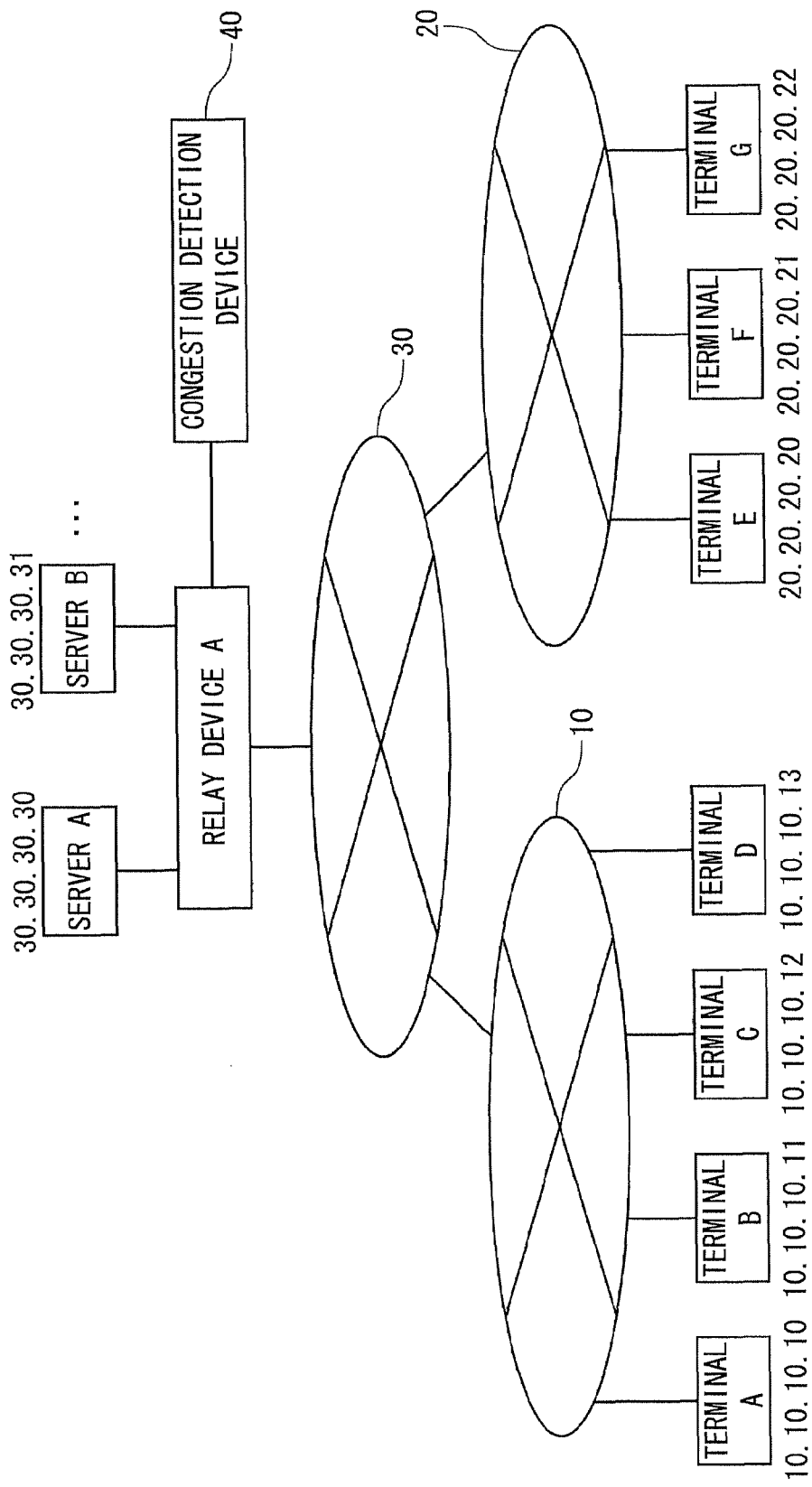
FIG. 1 illustrates an example of a network configuration that includes a congestion detection apparatus.

FIG. 1 illustrates an example of networks configuration that includes a congestion detection apparatus according to an embodiment of the present invention. Terminals A, B, C and D are connected to a network 10. Terminals E, F and G are connected to a network 20. Servers A, B, . . . are connected to a network 30 via a relay apparatus A. The networks 10 and 20 are connected to each other via the network 30.

Communication occurs between the terminals A, B, C, D, E, F and G, and the server A or B. A congestion detection apparatus 40 is connected to the servers A, B, . . . via the relay apparatus A, obtains packets transmitted/received between the terminals A, B, C, D, E, F and G, and the servers A, B, . . . , and judges whether there is congestion. To be specific, the congestion detection apparatus 40 is connected to the relay apparatus A, which may be a switch or TAP, for example, and is designed to be able to obtain packets that flow between terminals. Hereinafter, description will be given focusing on packets that are transmitted and received between the terminals A through G and the server A.

The address of each of the terminals includes a network portion and a host portion. The addresses assigned to each of the terminals that belong to the same network have the same network portion. For example, the network portions of addresses of the terminals A, B, C and D is 10.10.10, and their host portions vary as 10, 11, 12, and 13. Also, the network portions of addresses of the terminals E, F and G are 20.20.20, and their host portions vary as 20, 21 and 22.

Figure 2:
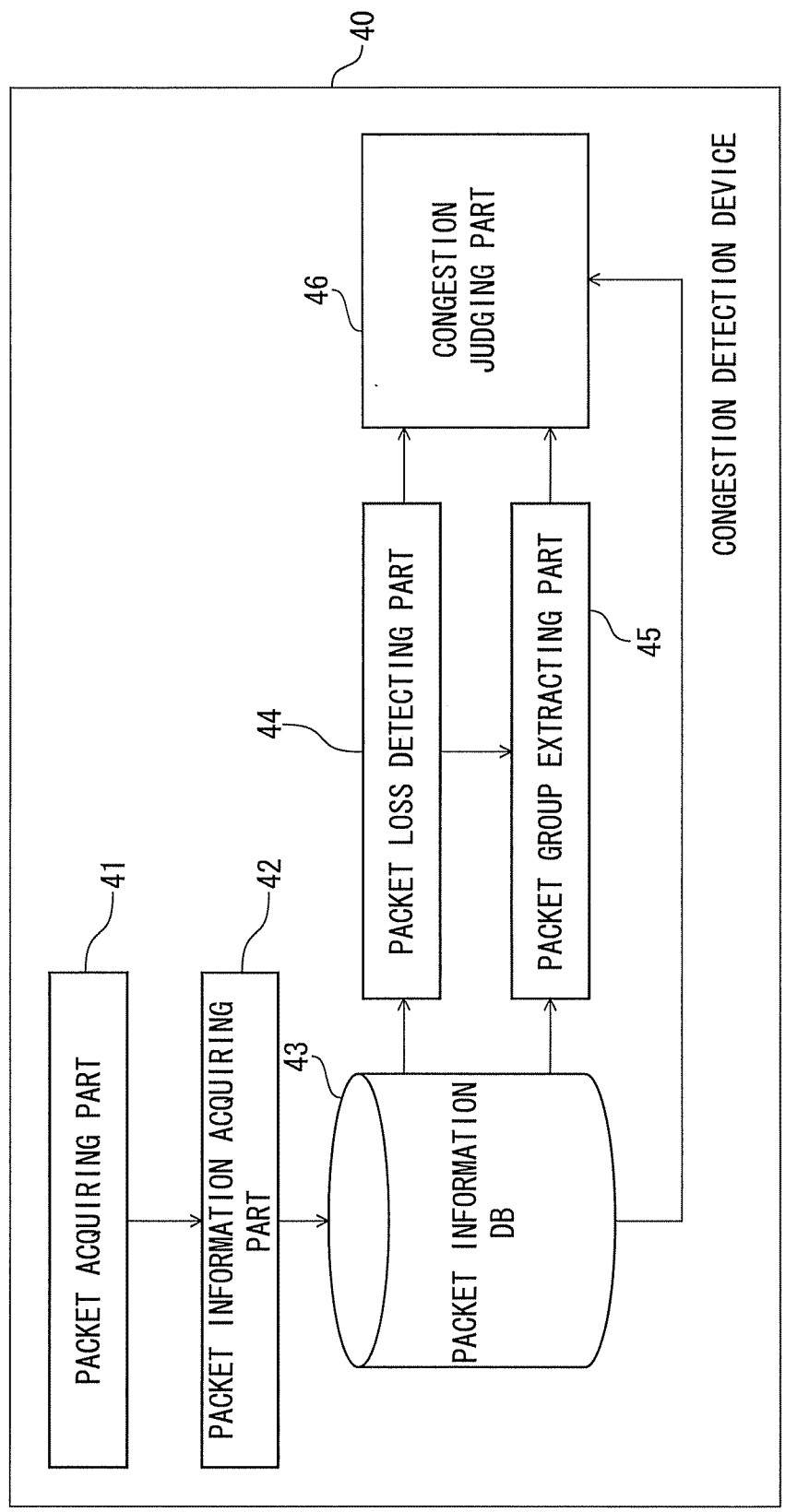
FIG. 2 illustrates an example block diagram illustrating a functional configuration of the congestion detection apparatus.

(2) An example of Functional Configuration of the Congestion Detection Apparatus FIG. 2 is an illustrative block diagram illustrating a functional configuration of the congestion detection apparatus. The congestion detection apparatus 40 includes a packet acquiring part 41, a packet information acquiring part 42, a packet information DB 43, a packet loss detecting part 44, a packet group extracting part 45, and a congestion judging part 46, for judgment of congestion.

The packet acquiring part 41 obtains packet that are transmitted and received via the server A. In the present embodiment, the packet acquiring part 41 acquires packets that are transmitted and received between the terminals A, B, C, D, E, F, G, and the server A.

The packet information acquiring part 42 identifies the type of a packet. The packet information acquiring part 42 obtains the time at which the packet acquiring part 41 acquired a packet. The packet information acquiring part 42 also obtains packet information, such as the source and destination addresses of a packet, in accordance with the type of the packet. The packet information DB 43 stores packet information obtained by the packet information acquiring part 42.

The packet group extracting part 45 extracts a packet group with reference to packet information in the packet information DB 43. A packet group is a group of data packets that are transmitted as a sequence from a transmitting terminal.

The packet loss detecting part 44 detects a packet loss by making reference to packet information in the packet information DB 43.

For communication between terminals, various protocols are available and the packet composition of transmitted/received packets differs depending on difference in protocol. Accordingly, with difference in protocol, packet information that can be obtained as well as the methods of packet loss detection and packet group extraction also differ. The methods of packet loss detection and packet group extraction will be described later.

The congestion judging part 46 judges whether congestion is occurring or not based on where in a packet group a packet loss has occurred. Here, congestion refers to a condition in which a network is overloaded with increase in communication traffic, and packets are discarded upon occurrence of congestion in order to avoid congestion. When packets are transmitted from a transmitting terminal to a receiving terminal as a sequence, congestion is more likely to occur in a posterior position in the packet group and packets in the posterior position are more likely to be discarded. The congestion judging part 46 judges occurrence of congestion based on the position of a packet loss being temporally posterior to a given position in a packet group. Methods of congestion judgment will be also described later.

(3) Methods of Packet Loss Detection and Packet Group Extraction

By illustrating Internet Protocol (IP), Real-time Transport Protocol (RTP), and Transmission Control Protocol (TCP) as examples of protocols, methods of packet loss detection and packet group extraction for each of the protocols will be described below.

(3-1) In the Case of IP (i) IP Packet Transmission

Figure 3:
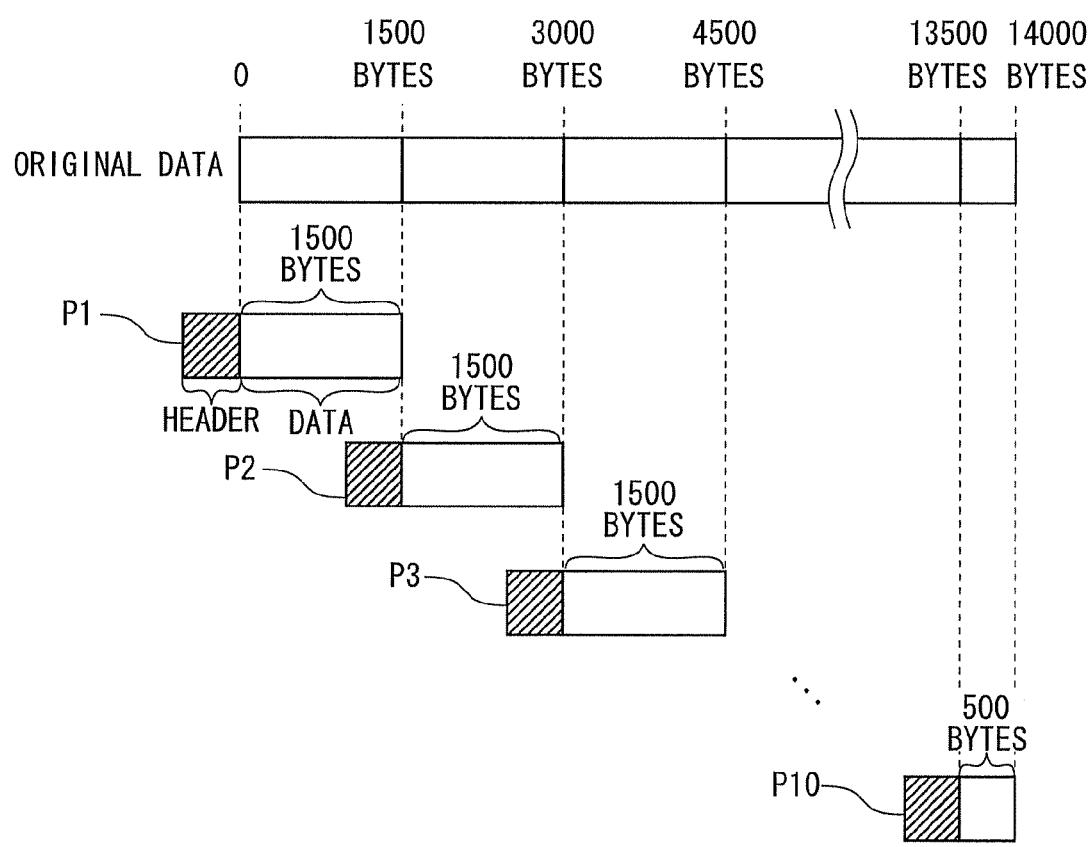
FIG. 3 illustrates an example of division of original data to form a plurality of IP packets.
Figure 4:
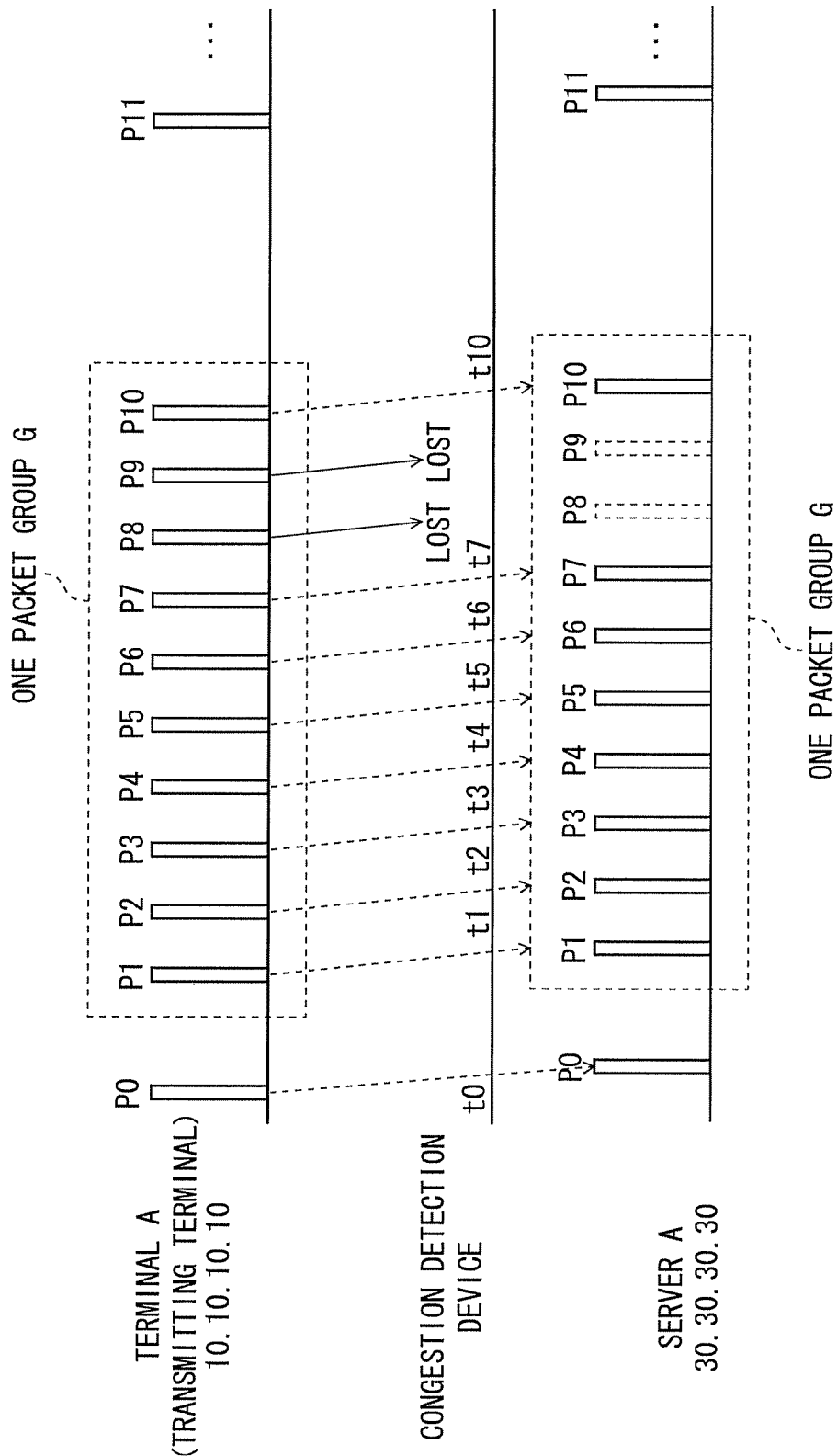
FIG. 4 illustrates an example of transmission of multiple IP packets as a sequence.

When original data exceeds a maximum number of bytes for an IP packet, the data is transmitted and divided into multiple IP packets. FIG. 3 illustrates how the original data is divided to form a plurality of IP packets. FIG. 4 illustrates transmission of a plurality of IP packets as a sequence. As illustrated in FIG. 3, the size of the original data is 14,000 bytes and the maximum number of bytes of data that can be transmitted in an IP packet is 1,500 bytes. Thus, the original data is divided into ten IP packets and transmitted. Here, 1,500 bytes is stored in each of IP packets P1 to P9, and 500 bytes is stored in IP packet P10. The IP packets P1 to P10 each have an IP header. For example, the terminal A as the transmitting terminal transmits IP packets P1 through P10 to the server A as the receiving terminal. As illustrated in FIG. 4, the IP packets P1 to P10 are transmitted from the terminal A to the server A. Here, the IP packets P1 to P10 are transmitted in sequence to form one packet group G, and it is assumed that packets P8 and P9 are lost, for example.

(ii) Acquisition of Packet Information

When IP packets are transmitted from the terminal A to the server A, the packet acquiring part 41 of the congestion detection apparatus 40 obtains the IP packets. The packet information acquiring part 42 detects the time at which each IP packet was obtained and identifies the type of the packets. Each of the IP packets is transmitted in an Ethernet (a registered trademark) frame and is identified as an IP packet when a "type" field value contained in an Ethernet header of the Ethernet frame is "0x0800".

FIG. 5 illustrates the structure of an IP header. "Identifier" is a field for describing an identification value which is given to an IP packet after division, and the same identification value is given to divided IP packets which constitute the same original data. "Flag" is a field that indicates whether the IP packet is the last IP packet that constitutes the original data, where "more fragment" means that it is an in-between IP packet and "no more fragment" means that it is the last IP packet. "Fragment offset" is a field that indicates which portion of the original data the IP packet constitutes. "Packet length" is a field that indicates the length of each packet, in which the sum of a header length and a data length is described. "Source IP address" is a field that indicates the IP address of the sender and "destination IP address" is a field that indicates the IP address of the destination.

The packet information acquiring part 42 first looks at the flag and fragment offset to determine whether the IP packet is fragmented. When the flag is "more fragment" or the fragment offset is not "0", the packet information acquiring part 42 determines that the IP packet is fragmented and acquires necessary information from its IP header, e.g., the source IP address, identifier, flag, fragment offset, and packet length.

The packet information DB 43 stores packet information, such as the time at which each IP packet was obtained and/or information extracted from IP headers. FIG. 6 illustrates an example of packet information stored in the packet information DB 43. For each packet number (No.), the source IP address, identifier, flag, fragment offset, packet length, and packet acquisition time are stored in one record. As the terminal A is the transmitting terminal, the source IP address is 10.10.10.

(iii) Detection of Packet Loss

The packet loss detecting part 44 detects a packet loss by referencing packet information in the packet information DB 43 for each record identified by a packet number. The packet loss detecting part 44 first calculates the sum (offset(k)+length(k)) of the fragment offset of an IP packet (a packet number represents the offset value of k as "offset(k)") and the packet length (a packet number represents the packet length of k as "length(k)"). Then, the packet loss detecting art 44 compares the sum (offset (k)+length(k)) of the preceding IP packet with the fragment offset (offset (k+1)) of the subsequent IP packet. The packet loss detecting part 44 determines that a packet loss is occurring when the sum of the preceding IP packet is smaller than the fragment offset of the subsequent IP packet, that is, when they satisfy the formula (1) below:

$$\text{offset}(k)+\text{length}(k)<\text{offset}(k+1) \quad (1)$$

For example, referring to FIG. 6, the sum (offset(k)+length (k)) of the IP packet P6 is 7,500+1,500=9,000, and offset (k+1) of the IP packet P7 is 9,000. Therefore, it does not satisfy the formula (1) and the packet loss detecting part 44 determines that no packet loss occurred On the other hand, the sum (offset(k)+length(k)) of IP packet P7 is 9,000+1,500=10, 500 and "offset(k+1)" of IP packet P10 whose packet information has acquired after IP packet P7 is 13,500. They therefore satisfy the formula (1) and the packet loss detecting part 44 determines that a packet loss has occurred. Here, the packet loss detecting part 44 finds out that the maximum number of bytes in a packet is 1,500 from the fact that the packet length of packets P1 to P7 is 1,500, for example. As the difference between the sum 10,500 of the IP packet P7 and the offset(k+1) of 13,500 for IP packet 10 is 3,000, the packet loss detecting part 44 determines that two packets are lost.

In the above-described manner, the packet loss detecting part 44 detects that two packets are lost between packets P7 and P10.

(iv) Packet Group Extraction

The packet group extracting part 45 extracts a packet group with reference to packet information in the packet information DB 43. According to FIG. 6, IP packets P1 to P7 and P10 have the same identifier of "100", the fragment offset of IP packet P1 is "0", and the flag of IP packet P10 is "no more fragment". From these facts, the packet group extracting part 45 extracts a series of packets that starts at IP packet P1 and ends at IP packet P10 as a packet group G.

In addition, it may be found that another packet group starts at IP packet P11 from the facts that the fragment offset of IP packet P11 is "0", the identifier changes to "200" from IP packet P11, and the IP packet P11 has the flag of "more fragment". From these facts, it may also be found that the packet group G ends at IP packet P10.

The end of a packet group may also be located from the packet length of an IP packet being shorter than the maximum byte length, not only when the flag of an IP packet is "no more fragment". When the next IP packet has not been acquired after elapse of a given time period after acquisition of the last IP packet, transmission of IP packets of the previous packet group is considered to be completed. These ways of determination are effective for judging the end of the packet group when an IP packet having the flag of "no more fragment" has been lost.

The start of packet group G may also be identified by both extracting one IP packet from the packet group based on the fragment offset of the extracted IP packet and determining how many packets precede that IP packet based on the maximum byte length of the packet. As an example, since the fragment offset of IP packet P7 is 9,000 and the maximum byte length is 1,500, it is found that the packet group G starts at IP packet P1, which is six packets before the IP packet P7.

Based on the packet group obtained by the packet group extracting part 45 and the result of detection by the packet loss detecting part 44 as described above, it is determined that the eighth and ninth IP packets, P8 and P9, are lost in the packet group consisting of IP packets P1 to P10.

When the last packet of a packet group is lost, it is preferable not to extract a packet group and perform congestion judgment. For example, judgment of congestion is preferably not performed when the last IP packet, P10, of packet group G is also lost in addition to the IP packets P8 and P9 in the IP packets from P1 to P10. In this case, the packet acquiring part 41 can only detect IP packets P1 to P7 of the packet group G. Thus, the packet group extracting part 45 does not recognize that the packet group G consists of IP packet P1 to P10. Judgment of congestion performed in such a case is hard to correctly judge whether congestion is occurring or not. Therefore, when the last packet of a packet group is lost, it is preferable not to extract a packet group and perform congestion judgment.

(3-2) In the Case of RTP

Now, the methods of packet loss detection and packet group extraction for RTP will be described.

(i) Transmission of RTP Packets

In RTP, original data is also divided into multiple RTP packets and transmitted as in IP when the original data exceeds the maximum number of bytes of an IP packet. Description of an example of configuration for dividing the original data to form a plurality of RTP packets is omitted as it is similar to FIGS. 3 and 4, which were used for description of IP packets.

(ii) Acquisition of Packet Information

As in FIGS. 3 and 4, RTP packets P1 through P10 are transmitted from the terminal A to the server A. Here, as illustrated in FIG. 4, when the RTP packets P1 to P10 are transmitted from the terminal A to the server A, the packet acquiring part 41 of the congestion detection apparatus 40 obtains the RTP packets P1 to P10. The packet information acquiring part 42 detects the time at which each RTP packet is obtained, and identifies the type of the packet. If the "type" field value in the Ethernet header is "0x0800," "protocol" field value in the IP header is "17," and the first two bits of data is "0x2," for example, the packet is identified as an RTP packet. The packet information acquiring part 42 extracts necessary information from each RTP packet.

Figure 7A:
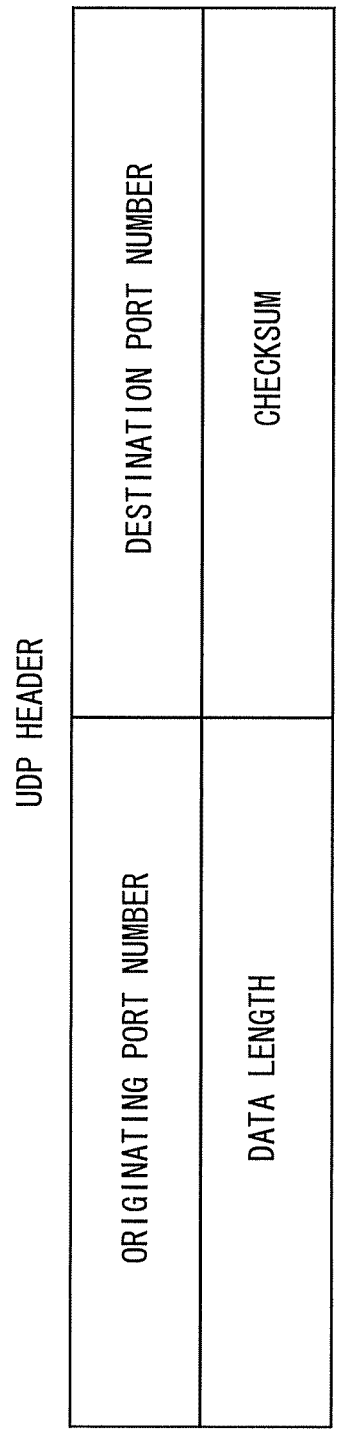
FIG. 7A illustrates an example of an exemplary structure of a UDP header.
Figure 7B:
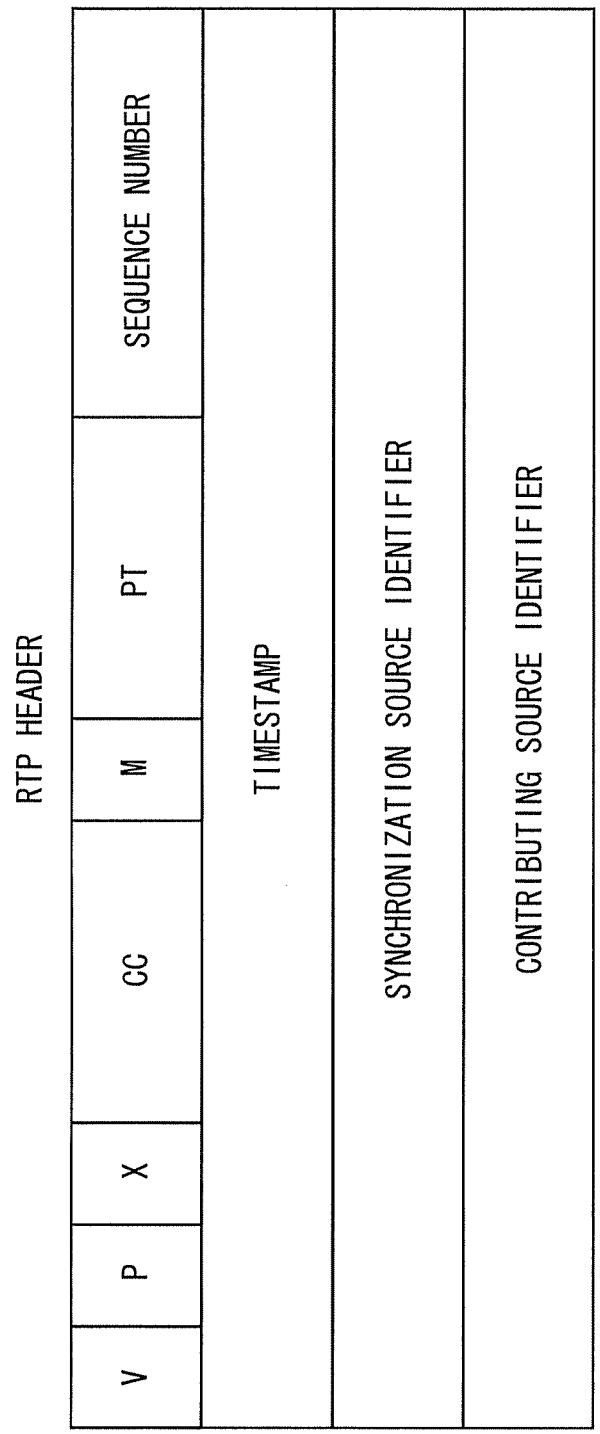
FIG. 7B illustrates an example of an exemplary structure of an RTP header.

An RTP packet contains an IP header, a User Datagram Protocol (UDP) header, and an RTP header. FIG. 7A illustrates the structure of a UDP header, and FIG. 7B illustrates an example structure of an RTP header. "Originating port number" in the UDP header is a field that indicates the port number of the originator, and "destination port number" is a field that indicates the port number of the destination. "Sequence number" in the RTP header is a field which is given a number that increments with each packet, representing the order of the packet. "Timestamp" is a field that indicates the time at which the oldest data contained in the packet was generated and is given the same timestamp value for indicating that RTP packets constitute the same original data.

The packet information acquiring part 42 obtains the source IP address and packet length from the IP header, the originating port number from the UDP header, and the timestamp and sequence number from the RTP header, for example.

The packet information DB 43 stores packet information such as the time at which each RTP packet was obtained and/or information extracted from headers. FIG. 8 illustrates an example of packet information stored in the packet information DB 43. The source IP address, port number, timestamp, sequence number, packet length, and the time of packet acquisition are stored in one record for each packet number.

(iii) Detection of a Packet Loss

The packet loss detecting part 44 detects a packet loss by finding missing of a sequence number for each record identified by a packet number in packet information in the packet information DB 43. Referring to FIG. 8, the packet loss detecting part 44 detects that RTP packets P8 and P9 are lost because sequence numbers S8 and S9 are missing.

(iv) Extraction of a Packet Group

The packet group extracting part 45 extracts a packet group by making reference to packet information in the packet information DB 43. As illustrated in FIG. 8, the timestamp of RTP packet P0 is "50," that of RTP packets P1 to P7 and P10 is "100," and the timestamp changes to "200" from RTP packet P11. In other words, RTP packets P0 and P1 have different timestamps and RTP packets P10 and P11 have different timestamps. Also, RTP packets P0 and P1 have respectively consecutive sequence numbers S0 and S1 and the RTP packets P10 and P11 have respectively consecutive sequence numbers S10 and S11, no sequence number being missing. From these facts, the packet group extracting part 45 considers that RTP packet P1 to P10 are transmitted as a sequence, and extracts the RTP packets P1 through P10 as one packet group.

When the last or first RTP packet of a packet group is lost, the lost RTP packet has no timestamp of be referenced. Thus, whether the lost RTP packet belongs to the preceding or subsequent packet group out of neighboring packet groups is determined in the following manner. When the packet length of the RTP packet that immediately precedes the RTP packet whose loss is detected is shorter than the maximum byte length of the packet, it is determined that the lost RTP packet is the first RTP packet of the subsequent packet group. Conversely, when the packet length of the RTP packet that immediately precedes the RTP packet whose loss is detected is equal to the maximum byte length of the packet, it is determined that the lost RTP packet is the last RTP packet of the preceding packet group. As an example, RTP packet P11 is determined to be lost in FIG. 8. In that case, since the packet length of RTP packet 10 is 500 and is less than the maximum byte length of 1,500, it is determined that RTP packet 11 does not belong to the packet group G, to which the RTP packet P10 belongs. The packet group extracting part 45 therefore determines that RTP packet 11 is the first RTP packet of the packet group that follows the packet group G. On the other hand, RTP packet P10 is determined to be lost. In this case, the packet length of RTP packet P7 is 1,500 bytes, which is the maximum byte length. Therefore, the packet group extracting part 45 determines that RTP packet 10 is the last RTP packet of the packet group G.

(3-3) In the Case of TCP

Next, the methods of packet loss detection and packet group extraction in TCP are described. In TCP, a transmitting terminal sends a given number of TCP packets as a sequence at intervals of Round Trip Time (RTT). Upon receiving TCP packets, the receiving terminal returns an ACK that indicates up to which TCP packets the receiving terminal has received. When the ACK has been returned from the receiving terminal, the number of packets that will be transmitted in the next RTT period is incremented, for example, one by one.

In the IP or RTP described earlier, when a packet is lost before reaching the congestion detection apparatus 40, it is determined that a packet loss has been detected. In other words, it is determined that the packet loss has not be detected when a packet is lost after reaching the congestion detection apparatus 40. In TCP, however, an ACK is returned after the receiving terminal receives TCP packets as mentioned above. It is accordingly possible to detect a packet loss by analyzing an ACK even if a TCP packet is lost after being detected in the congestion detection apparatus. In TCP having such a characteristic, the ways of packet loss detection and packet group extraction differ between (a) when a TCP packet is lost before reaching the congestion detection apparatus 40 and (b) when a TCP packet is lost after reaching the congestion detection apparatus 40. Hereinafter, an example of the structure of a TCP header is first illustrated and then the cases (a) and (b) are described.

A TCP packet contains an IP header and a TCP header. FIG. 9 illustrates an example of the structure of a TCP header. "Source port number" is a field indicating the port number of the sender and "destination port number" is a field indicating the port number of the destination. "Sequence number" is a field which is given a number that increments with each packet, representing the sequence of the packet. "ACK number" is a field that indicates the sequence number of a TCP packet for which reception has been verified by the receiving terminal.

Next, the methods of packet loss detection and packet group extraction will be described for each of the cases (a) and (b) above.

Figure 10B:
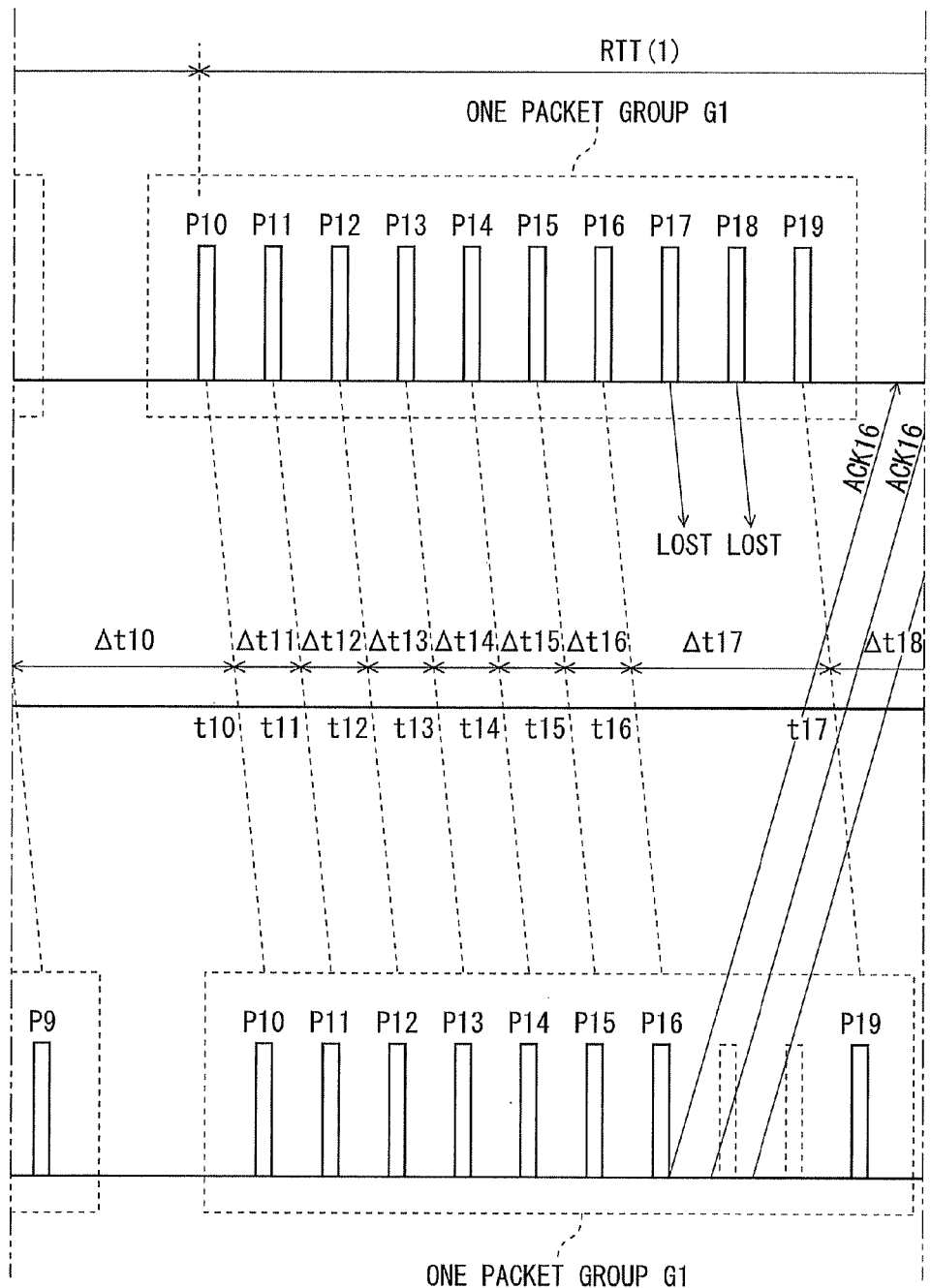
Figure 10C:
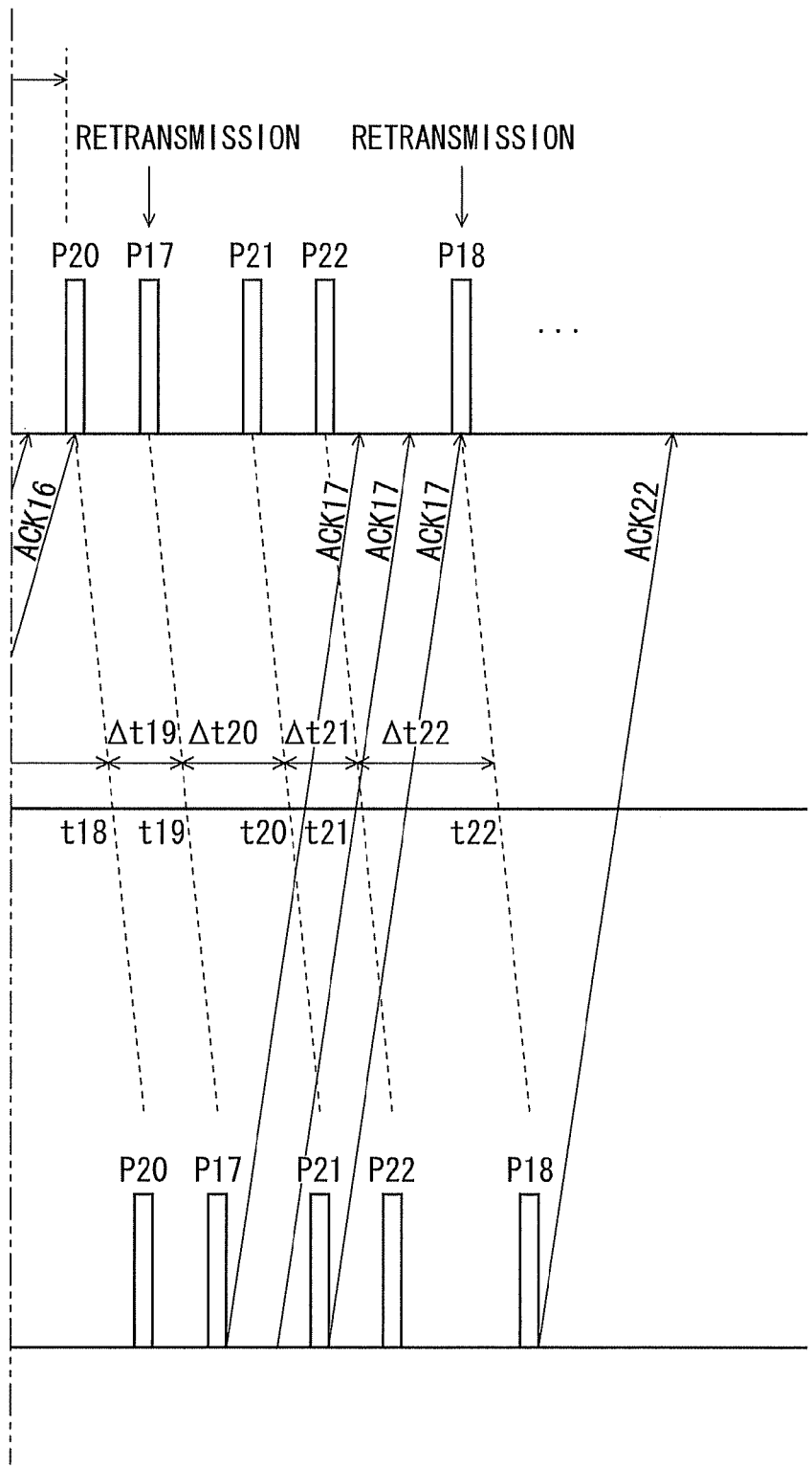

(a) When a TCP Packet is Lost Before Reaching the Congestion Detection Apparatus (i) Transmission of TCP Packets First, a case where a TCP packet is lost before it reaches the congestion detection apparatus 40 is described. FIGS. 10A-10C illustrate a case where a TCP packet is lost before reaching the congestion detection apparatus 40. TCP packets are transmitted from terminal A as the transmitting terminal to server A as the receiving terminal. Here, TCP packets are transmitted from the terminal A to the server A in the manner illustrated in FIG. 10A. In RTT(0) period, a packet group G0 including nine TCP packets P1 to P9 is transmitted. The nine TCP packets P1 to P9 are transmitted to the server A without loss. Next, in FIG. 10B, in RTT(1) that follows RTT(0) period, a packet group G1 that includes ten TCP packets P10 to P19 and one packet more than in RTT(0) is transmitted. TCP packets P10 to P16 and P19 are transmitted to the server A without being lost, but TCP packets P17 and P18 are lost. The server A, which is the receiving terminal, transmits ACKs to the terminal A in response to reception of TCP packets. FIG. 10C illustrates retransmission of the lost TCP packets P17 and P18 and the respective ACKs to the retransmissions. Note that only portions necessary for description are shown in relation to ACKs.

In the case of (a), TCP packets P17 and P18 are lost before they reach the congestion detection apparatus 40 as illustrated in FIGS. 10A-10B, thus the congestion detection apparatus 40 can detect the loss of TCP packets P17 and P18 based upon the transmitted ACKs.

(ii) Acquisition of Packet Information

The packet acquiring part 41 of the congestion detection apparatus 40 detects TCP packets that are transmitted from the terminal A to the server A as well as ACKs that are transmitted from the server A to the terminal A. The packet information acquiring part 42 detects the time when each TCP packet was acquired and identifies the type of packets. Here, when "type" field value contained in the Ethernet header is "0x0800" and "protocol" field value in the IP header is "6," for example, the packet is identified as a TCP packet.

When data is stored in a TCP packet, that is, when the data length is longer than zero, the packet information acquiring part 42 obtains next data, for example, (1) the source IP address and the destination IP address from the IP header, (2) the source port number, (3) destination port number, and (4) sequence number from the TCP header. The packet information acquiring part 42 also calculates packet intervals from times of TCP packet acquisition and calculates the average value and the standard deviation of the packet intervals. The packet information DB 43 stores these pieces of packet information. FIGS. 11A, 11B and 12 illustrate examples of packet information stored in the packet information DB 43 for packets that contain data. FIGS. 11A and 11B illustrate that source IP address, source port number, destination IP address, destination port number, sequence number, time of packet acquisition, and packet interval are stored in one record for each packet number. FIG. 12 illustrates that the average value and standard deviation of packet intervals are stored by source IP address and updated as needed.

On the other hand, when no data is stored in a TCP packet, that is, for an ACK whose data length is equal to zero, the packet information acquiring part 42 obtains the source IP address and destination IP address from the IP header, and source port number, destination port number, and ACK number from the TCP header, for example. Here, the packet information acquiring part 42 counts the number of times an ACK number is transmitted from a receiving terminal for indicating to the transmitting terminal of a packet loss. If the TCP packet is an ACK packet, the packet information DB 43 stores these pieces of packet information. FIG. 13 illustrates an example of packet information stored in the packet information DB 43 for ACK packets. The figure illustrates that a source IP address, source port number, destination IP address, destination port number, ACK number, and ACK number count value are stored in one record for each packet number.

(iii) Detection of Packet Loss

The packet loss detecting part 44 detects a packet loss by finding missing of a sequence number for each record identified by a packet number in packet information in the packet information DB 43. Referring to sequence numbers in FIG. 11A in order, number S19 is stored after sequence number S16 and sequence numbers S17 and S18 are missing. From this fact, the packet loss detecting part 44 detects loss of TCP packets P17 and P18 that have the sequence numbers S17 and S18.

Packet loss can also be detected from the following matters. In FIG. 11B, sequence numbers S17 and S18 are stored after sequence numbers S20 and S22, respectively, i.e., in orders different from where S17 and S18 are supposed to be in orders. Based on this fact, it is determined that TCP packets P17 and P18 have been lost and retransmitted. A packet loss can also be detected from the count value of ACK numbers being equal to or greater than a given value. An ACK number is information for indicating to the transmitting terminal up to which TCP packet the receiving terminal has received, and ACKs having the same ACK number are transmitted from the receiving terminal when a packet loss has occurred. Assume that the given value for determining a packet loss is three transmissions of the same ACK number. Referring to FIG. 13, as the count value of ACK numbers ACK16 and ACK17 is three, loss of TCP packets P17 and P18 can be detected.

(iv) Extraction of a Packet Group

The packet group extracting part 45 learns that two packets, TCP packets P17 and P18, are lost between records identified by packet numbers P16 and P19 from the packet loss detecting part 44. The packet group extracting part 45 makes reference to packet information in the packet information DB 43 to extract a packet group in which the detected packet loss has occurred.

In a packet group in which packet loss has occurred, consecutive transmission of packets is broken due to the packet loss. However, for judgment of congestion based on the position in the packet group where a packet loss has occurred, it is necessary to extract the entire packet group that contains the packet loss. A packet group with no packet loss can be easily extracted by finding a boundary between packet groups by comparing packet intervals with a given value, for example. Thus, a packet group with a packet loss is extracted by estimating the number of packets contained in the packet group with packet loss based on the number of packets in a packet group that has no packet loss and a given rule of change.

It is first assumed that the packet group extracting part 45 previously holds a given rule of change in the number of packets between neighboring packet groups. Assume that the rule of change specifies that when packets are transmitted without loss during the previous RTT interval, the number of packets that are transmitted during the next RTT interval is the sum of the number of packets transmitted during the previous RTT interval and one, for example. The packet group extracting part 45 compares each of packet intervals with the given value temporally tracing back from the position where the first packet loss occurred. Then, when it finds a position where the packet interval is greater than the given value, it regards that position as the start of packet group G1 in which packet loss has occurred and the end of the preceding packet group G0. It further temporally traces back to compare packet intervals with the given value, and when it finds another position where the packet interval is greater than the given value, it regards the position as the start of the preceding packet group G0. Then, it determines the number of packets contained in the preceding packet group G0. The packet group extracting part 45 adds one to the determined number of packets in the preceding packet group based on the rule of change mentioned above to determine the number of packets in the packet group G1 in which the packet loss has occurred. Finally, it extracts the packet group G1 based on the start of packet group G1 and the number of packets in the packet group G1 determined.

Here, because packet intervals are not constant and has distribution, the given value is a value that takes such distribution into consideration. The given value may be: the average packet interval+1.96×the standard deviation of packet intervals, for example. It is determined that packets are transmitted as a sequence when the packet intervals between them are smaller than the given value that takes the distribution into consideration. On the other hand, when a packet interval is greater than the given value, that point is determined to be a boundary between packet groups and packet group G1 is extracted.

The given value may also be a value that is decided based on the average packet interval, such as the average packet interval multiplied by a certain factor. The given value may be twice the average packet interval, for example. When the packet interval is smaller than twice the average value, it is determined that packets are transmitted in a sequence. On the other hand, when a packet interval is greater than twice the average value, the position is determined to be a boundary between packet groups and packet group G1 is extracted.

Extraction of a packet group is described using FIGS. 10A to 12. FIGS. 10A-10C and 11 illustrate that the source IP address is 10.10.10.10. Based on this IP address, the packet group extracting part 45 obtains the average value of packet intervals, 1.2 ms, and the standard deviation, 0.2 ms, from FIG. 12. Accordingly, the given value is: 1.2 ms+1.96×0.2 ms=1.592 ms.

As illustrated in FIGS. 10A-11B, it can be seen that the TCP packet P17 is first lost in packet group G1 because TCP packets P17 and P18 are lost in the packet group G1. Thus, the packet group extracting part 45 temporally traces back from TCP packet P17 to determine $\Delta t16$ which is the packet interval between TCP packets P16 and P15. The packet interval $\Delta t16$ is 1.2 ms, which is smaller than the given value of 1.592 ms. Comparison further back in time detects that $\Delta t10$ which is the packet interval between TCP packets P10 and P9 is 10.0 ms, being longer than the given value of 1.592 ms. Based on the result of detection, the packet group extracting part 45 determines that the packet group G1 starts at TCP packet P10 and the packet group G0 ends at TCP packet P9. Further repeating a similar process, it is detected that $\Delta t1$ which is the packet interval between TCP packets P1 and P0 is 5.0 ms and is greater than the given value of 1.592 ms. Based on the result of detection, the packet group extracting part 45 determines that the packet group G0 starts at TCP packet P1. This illustrates that the preceding packet group G0 is made up of nine packets from TCP packet P1 to P9. Thus, the packet group extracting part 45 adds one to the number of packets in the preceding packet group G0 to calculate the number of packets in packet group G1, in which packet loss has occurred, as ten. Through this process, it can be found out that packet group G1 is made up of TCP packets P10 to P19. In this way, the number of packets in the packet group G1 in which packet loss has occurred can be determined based on the number of packets in packet group G0 that has no packet loss and that precedes the packet group G1.

Figure 14A:
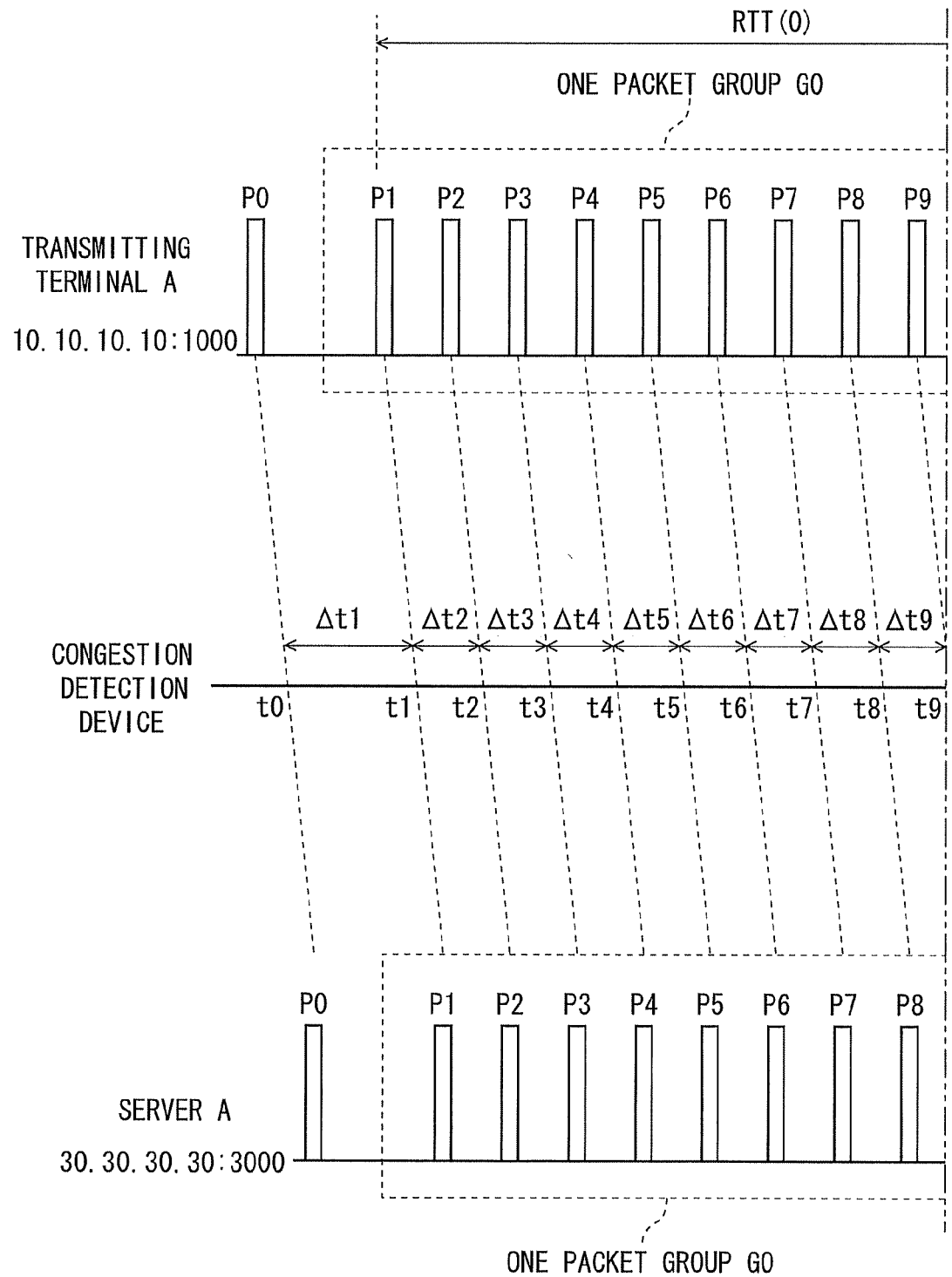
FIGS. 14A-14C (FIG. 14A-14C are connected in successive order as illustrated in a right upper part of FIG. 14A) illustrate an example of a case where TCP packets are lost after reaching the congestion detection apparatus.
Figure 14B:
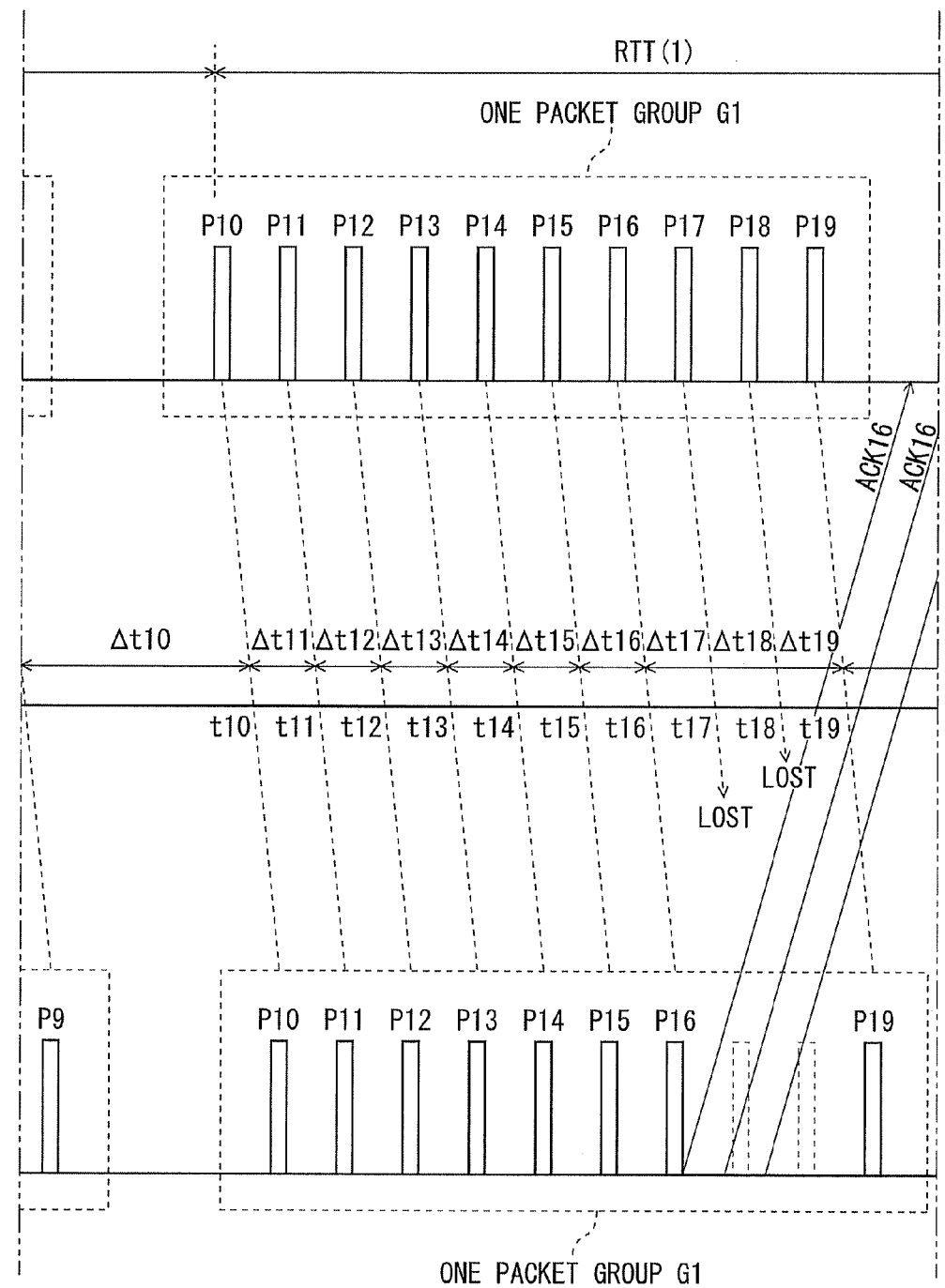
Figure 14C:
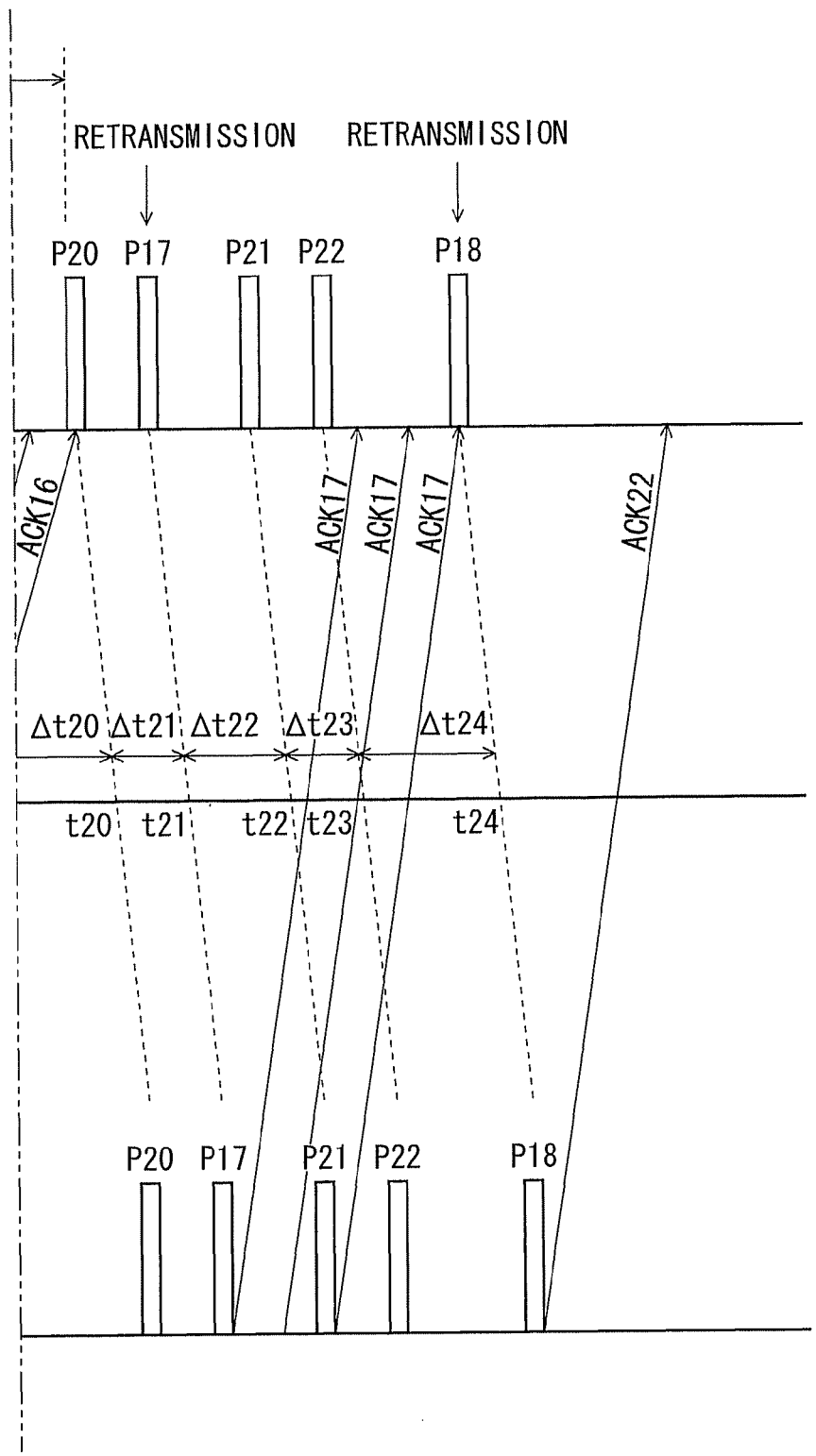

(b) When TCP Packets are Lost After Reaching the Congestion Detection Apparatus (i) Transmission of TCP Packets Next, a case where TCP packets are lost after reaching the congestion detection apparatus 40 is described. FIGS. 14A-14C illustrate a case where TCP packets are lost after they reach the congestion detection apparatus 40. Description about TCP packets transmitted and received between terminal A as the transmitting terminal and server A as the receiving terminal is omitted as they are similar to the ones illustrated in FIGS. 10A-10C. However, while in (a) TCP packets P17 and P18 are lost before reaching the congestion detection apparatus 40, in (b) they are lost after reaching the congestion detection apparatus 40.

(ii) Acquisition of Packet Information

Description of the way of acquiring packet information is omitted as it is similar to (a) described earlier. The packet information DB 43 stores packet information obtained by the packet information acquiring part 42. FIGS. 15A and 15B illustrate an example of packet information stored in the packet information DB 43 for packets that contain data. FIGS. 15A-15B illustrate that a source IP address, source port number, destination IP address, destination port number, sequence number, time of packet acquisition, and packet interval are stored in one record for each packet number. The average value and standard deviation of packet intervals are also stored as in FIG. 12, and they are stored also for ACK packets as in FIG. 13.

(iii) Detection of Packet Loss

In the case of (b), TCP packets are lost after reaching the congestion detection apparatus 40, thus the packet loss detecting part 44 detects a packet loss based on retransmission of TCP packets. The packet loss detecting part 44 makes reference to a sequence number in each record identified by a packet number in the packet information in the packet information DB 43 of FIGS. 15A-15B. As sequence numbers from S10 to S19 are arranged in order in packet group G1, no packet loss can be detected from this data. Further referring to FIG. 15B, sequence numbers S17 and S18 are stored again. From this fact, the packet loss detecting part 44 determines that the TCP packets P17 and P18 have been lost and retransmitted.

Alternatively, as mentioned above in (a), loss of TCP packets P17 and P18 can also be detected from the count value of ACK numbers being, for example, three or greater. The loss of TCP packets P17 and P18 can also be detected from the fact that the TCP packets P17 and P18 are stored after sequence numbers 20 and 22, i.e., in orders different from where they are suppose to be.

(iv) Extraction of a Packet Group

The packet group extracting part 45 learns that TCP packets P17 and P18 are lost from the packet loss detecting part 44 and extracts a packet group that contains the TCP packets P17 and P18. In the case of (b), the TCP packets P17 and P18 are lost after they reach the congestion detection apparatus 40. Thus, in the packet group G1 illustrated in FIGS. 14A-14C and 15A-15B, sequence numbers from S10 through S19 are arranged in order. Accordingly, in the case of (b), the packet group G1 can be extracted based on data on packet group G1 in which packet loss has occurred.

To be specific, the packet group extracting part 45 compares packet intervals with a given value temporally going back from where the packet loss has occurred and along the course of time. It thereby finds a position where a packet interval is greater than the given value before and after the position of the packet loss to find the start and end of the packet group G1 in which the packet loss has occurred.

Extraction of packet group G1 is described using FIGS. 12, 14A-14C and 15A-15B. In the above-described manner, a given value that considers the average value and standard deviation of packet intervals is calculated from FIG. 12. Focus on TCP packet P17, for instance, out of the lost TCP packets P17 and P18. The packet group extracting part 45 finds a position where a packet interval is greater than the given value before and after the TCP packet P17. Δt10 which is the packet interval between TCP packets P10 and P9 is 10.0 ms which is greater than 1.592 ms which is the given value. Also, Δt20 which is the packet interval between TCP packets P19 and P20 is 7.0 ms, which is greater than 1.592 ms which is the given value. Based on these, the packet group G1 made up of TCP packets P10 to P19 can be extracted.

In the case of (b), the number of packets contained in a packet group with a packet loss may also be calculated from the number of packet in a packet group with no packet loss as in (a).

(4) Congestion Judgment Method

Now, the method of congestion judgment performed by the congestion judging part 46 will be described.

Basically, it is judged that congestion is occurring when the position where a packet loss has occurred is temporally posterior to a given position in a packet group. The given position may be any position within a packet group from its center to latter half portion in terms of packet acquisition time by a congestion detector, such as the congestion detection device 40. The given position can be arbitrarily set within the range in accordance with the accuracy of congestion judgment. Congestion is more likely to occur at a later point in a packet group and accordingly a packet loss is more likely to occur at a later point in a packet group. The congestion detection method can detect congestion more accurately and prevent false detection because it judges whether congestion has occurred or not based on such a trend.

As specific examples of the congestion judgment method, three methods will be depicted by illustrating the aforementioned packet group G1 of TCP packets. As congestion can be judged in various ways, the congestion detection apparatus 40 takes into consideration the accuracy of congestion judgment required by the system and/or network characteristics and judges whether congestion has occurred or not according to one congestion judgment method it selected. In addition, to eliminate fluctuations in results of judgment, preferably all congestion judgments should be performed with one judgment method selected, although, the embodiments are not limited to selecting only one judgment method, and a combination of judgment methods can be selected according to application criteria and/or trends.

(4-1) Judgment Method 1

Judgment method 1 judges that congestion is occurring, if the number of packet losses that have occurred at positions temporally posterior to the given position in a packet group, is greater than the number of packet losses that have occurred at positions temporally anterior to (preceding) the given position.

Figure 16:
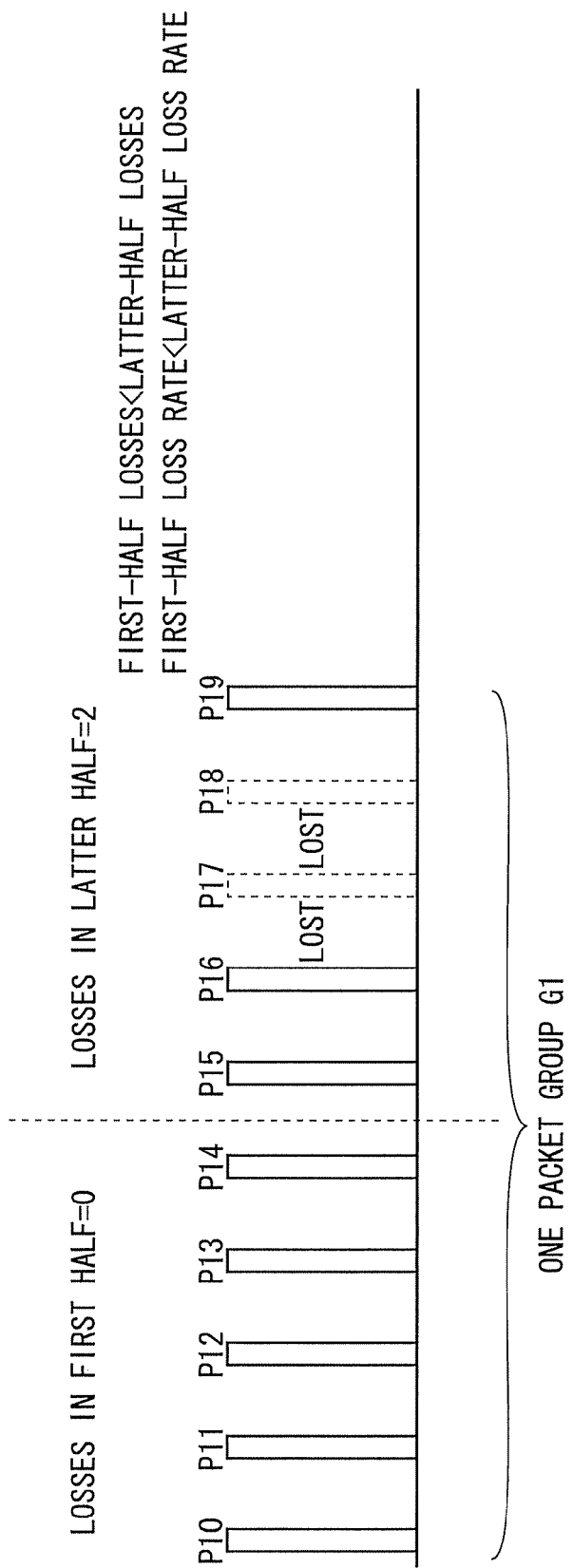
FIG. 16 illustrates an exemplary diagram for describing judgment method 1.

FIG. 16 is a diagram illustrating the judgment method 1. As illustrated in FIG. 16, in the TCP packet example mentioned above, the packet group G1 is made up of TCP packets P10 to P19, where TCP packets P17 and P18 are lost. The given position is set to a position that halves the packets contained in the packet group G1, for example. In the case shown in FIG. 16, the packet group G1 is divided at the given position into two portions of the first-half TCP packets P10 to P14 and the latter-half packets P15 to P19. Then, the number of losses in the first-half which is 0 is compared with the number of losses in the latter-half which is 2. As the latter-half losses are more than the first-half losses, it is judged that a packet loss has occurred at a posterior position in the packet group and congestion is taking place.

It may also be judged that congestion is occurring when comparison of the first-half loss rate with the latter-half loss rate illustrates that the latter-half loss rate is higher than the first-half loss rate. For example, the first-half and latter-half packet loss rates may be calculated from the numbers of latter-half and first-half packet losses, respectively, with respect to the total number of packets, and the rates may be compared with each other.

(4-2) Judgment Method 2

Figure 17:
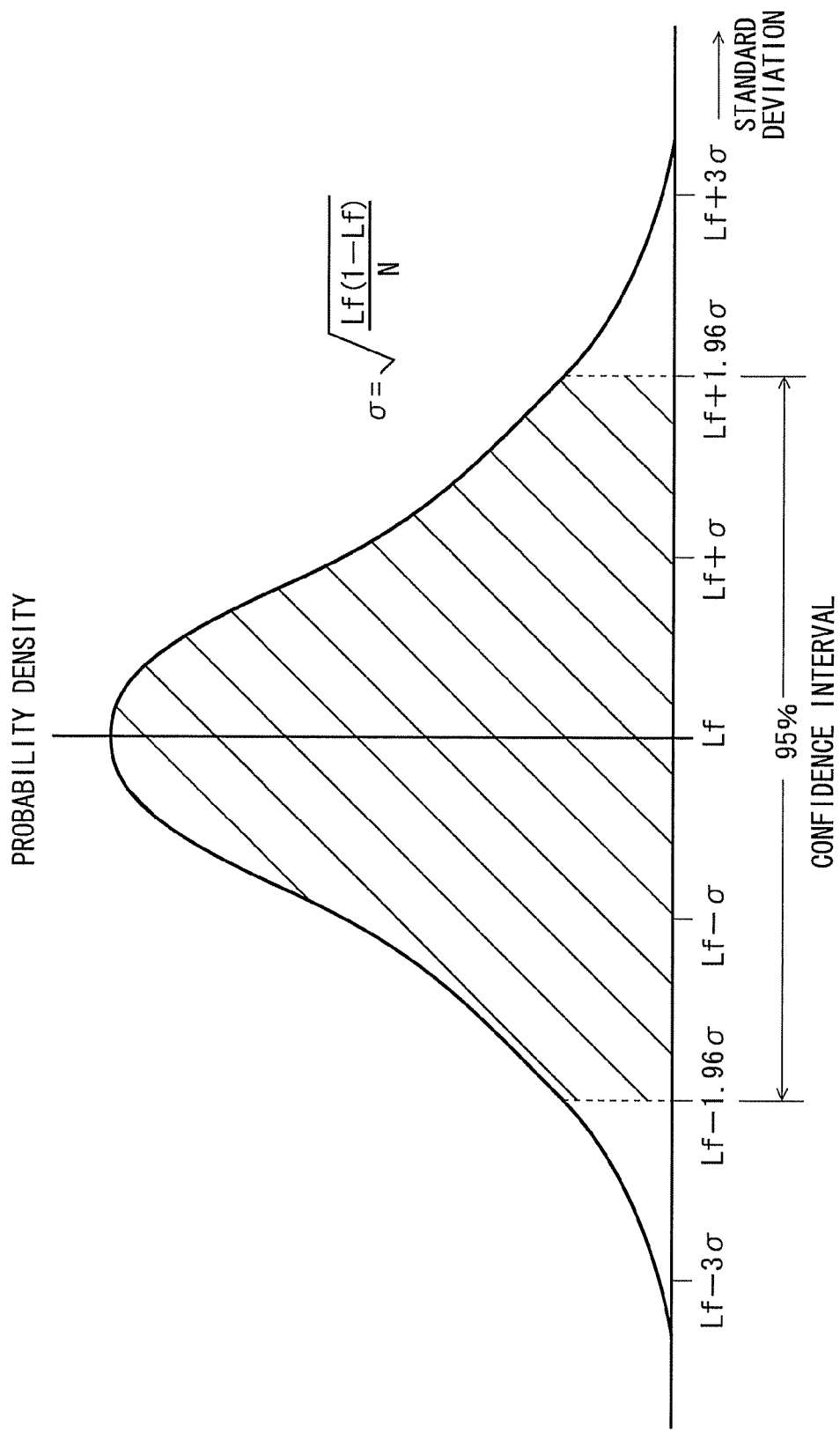
FIG. 17 illustrates an exemplary diagram for describing judgment method 2.

FIG. 17 is a diagram for illustrating judgment method 2. The judgment method 2 first statistically estimates B % confidence interval of the population mean of loss rates using the packet loss rate and the number of packets temporally anterior to the given position in the packet group. Next, the judgment method 2 determines the upper limit of the estimated confidence interval as a threshold value A. It is judged that congestion is occurring when the packet loss rate temporally posterior to the given position in the packet group is higher than the threshold value A.

According to this method, the threshold value A for judging that congestion is occurring is estimated from the packet loss rate and the number of packets in the anterior portion. Here, B may be 95%, for example, and is a value that defines a so-called confidence interval as illustrated in FIG. 17. The upper limit of this confidence interval is the threshold value A, which is represented by the formula (2) or (3) below:

$$\text{Threshold value } A = L_f + 1.96\sqrt{L_f(L-L_f)/N} \quad (L_f \neq 0) \quad (2)$$

$$\text{Threshold value } A = 1-(0.95)^{1/N} \quad (L_f = 0) \quad (3)$$

where "Lf" represents the packet loss rate in the anterior portion, and "N" is the number of packets that precede (i.e., number of packets in the anterior portion to) the given position in the packet group.

In the TCP packet example described above, the given position in the packet group G1 is set to a position that halves the number of packets contained in G1, for example. Since only TCP packets P17 and P18 are lost, the packet loss rate, Lf, of the first half is 0%, and the packet loss rate of the latter half is 40%. Substituting Lf=0 and N=5 into the formula (3), which can be used for when Lf=0, results in threshold value A=54.9. As the packet loss rate of the latter half, 40%, is smaller than the threshold value A, it is judged that no congestion is occurring.

Conversely, assume that a TCP packet P11 in the first half is further lost in the packet group G1, for example. In this case, the packet loss rate of the first half, Lf, is 20%, and threshold value A=36.3 is obtained from the formula (2) above, which can be used when Lf≠0. As the packet loss rate in the latter half, 40%, is greater than the threshold value A, it is judged that congestion is occurring.

(4-3) Judgment Method 3

Figure 18:
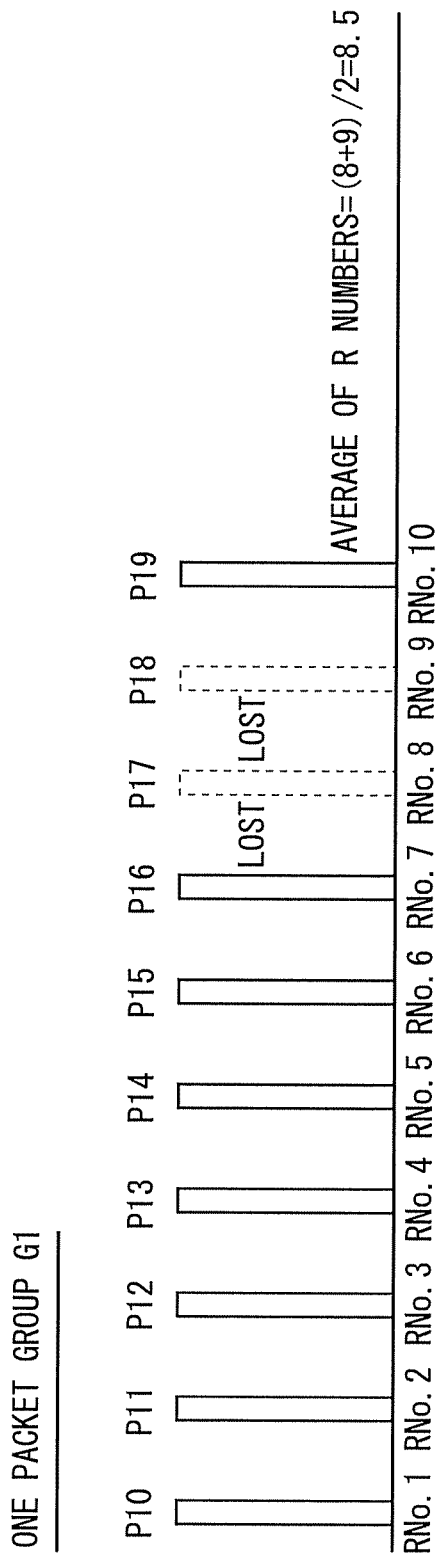
FIG. 18 illustrates a first exemplary diagram for describing judgment method 3.
Figure 19:
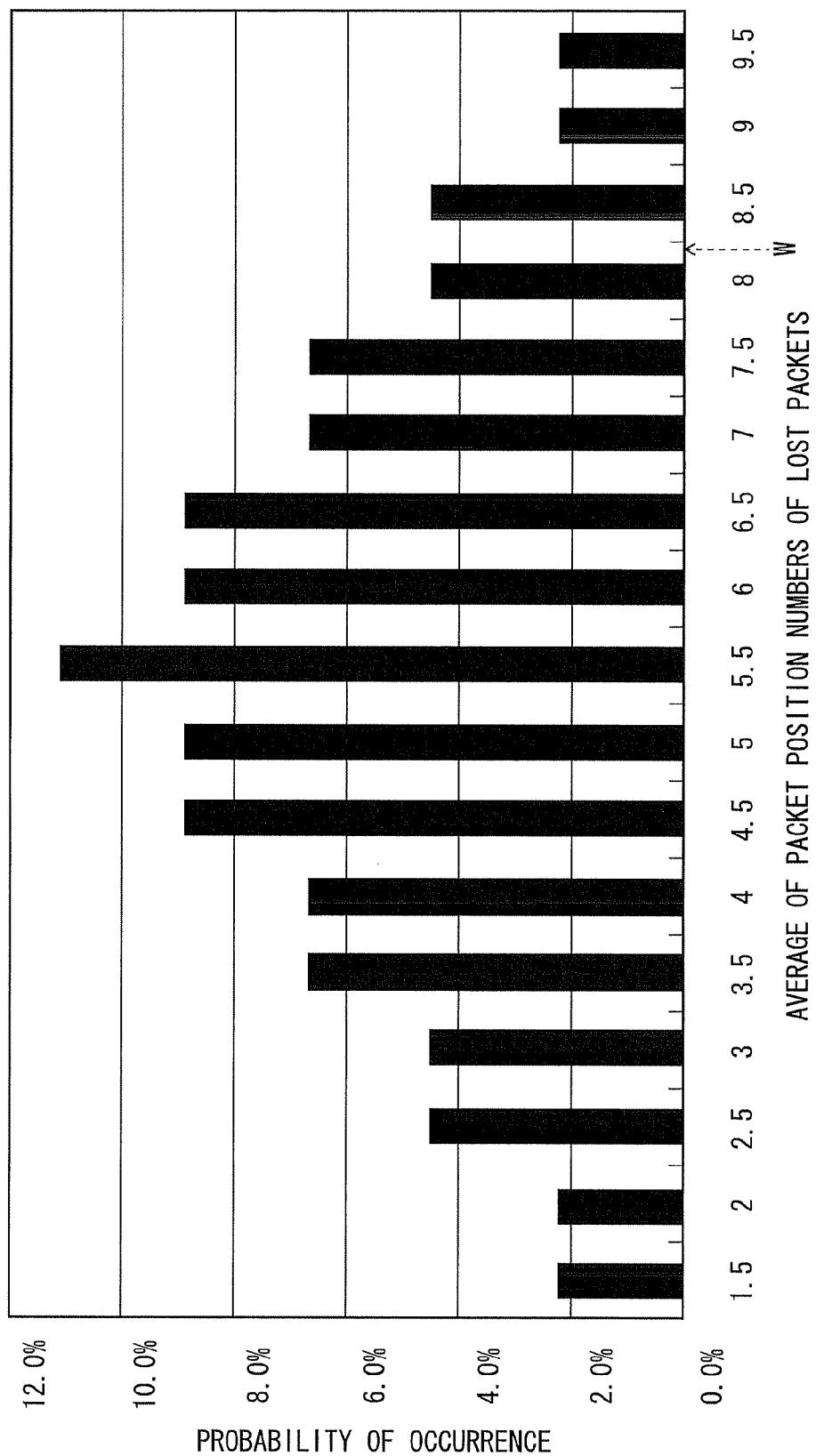
FIG. 19 illustrates a second exemplary diagram for describing judgment method 3.

FIGS. 18 and 19 are diagrams for illustrating judgment method 3. As illustrated in FIG. 18, R numbers 1 to 10 are given to TCP packets P10 to P19 that constitute the packet group G1 from the start of packet group G1. Based on R numbers 8 and 9 of the lost TCP packets P17 and P18, the average value M of R numbers is calculated as: (8+9)/2=8.5.

The packet group G1 has ten packets and two packet losses. Based on this, consider a case where two packets are randomly lost in a virtual packet group with ten packets. In the virtual packet group, packet position numbers 1 to 10 are sequentially given starting at the first packet. Here, the distribution shown in FIG. 19 is determined for the average value of the packet position numbers of the two lost packets. Then, a threshold value W of the average value for being in a top given percentage is determined and compared with the calculated average value M of R numbers. If the average value M of R numbers is greater than the threshold value W, it is judged that a loss is occurring at a posterior point in the packet group and congestion is taking place. The threshold value W of the average value for being in the top 5% may be 8.5, for example, and because the average value M of R numbers calculated, 8.5, is equal to or greater than the threshold value W, it is judged that congestion is occurring.

The judgment method described above can be represented by formula (4) below. Let a packet position number be N (an order of a packet within the packet group) that indicates packet count from the start of a packet group a packet loss has actually occurred. When "i" is varied in sequence as i=x, x−1, . . . and so on in the formula (4) below, it is judged congestion is occurring if the average value M of packet position numbers N at the position where packet loss has occurred is greater than the threshold value W which is the first value of "i" that meets the formula (4).

$$\frac{\sum_{t=i}^{x} F(x, y, t \times y)}{{}_xC_y} > Z \qquad (4)$$

where "F(a,b,c)" shows the frequency of pattern that a sum of b figures selected from 1 to a becomes a figure of c, "x" is the number of packets in the packet group, "y" is the number of packet losses in the packet group, and "Z" is a given lower limit for judging that congestion is occurring.

$$\sum_{t=i}^{x} F(x, y, t \times y)$$

is the number of patterns in which the average value M assumes values from i to x. ${}_xC_y$ indicates the total number of patterns for the packet position number at which a packet loss has occurred when y packets are randomly lost in the virtual packet group with x packets, and the formula (4) represents the probability that the average value M assumes "i" or greater out of the total number of patterns.

Here, "Z" is set to 5%, for example. The values "x", "y", and "i" are integers greater than or equal to one.

(5) Result of Congestion Judgment

FIGS. 20A and 20B illustrate example results of congestion judgment performed by the congestion judging part 46, illustrating results of congestion judgment by packet group. FIG. 20A illustrates results in a case TCP packets are lost before reaching the congestion detection apparatus 40. That is, they are congestion judgments performed when TCP packets are transmitted from the transmitting terminal to the server, where results of congestion judgment are compiled by source IP address. On the other hand, FIG. 20B illustrates results in a case TCP packets are lost after reaching the congestion detection apparatus 40. That is, they are congestion judgments performed when TCP packets are transmitted from the server to the receiving terminal, where results of congestion judgment are compiled by destination IP address. More For example, in FIGS. 20A and 20B, the number (No.) of a packet group in which a packet loss has occurred, the number of consecutive transmissions in that packet group, the number of packet losses, the sequence numbers of lost packets, and judgment of congestion are compiled either by source or destination IP address. This enables judgment of congestion condition on each terminal. For RTP and IP packets, results of congestion judgment are complied by source IP address because packet losses before reaching the congestion detection apparatus 40 are detected.

The congestion judging part 46 may also count the number of losses in the posterior portion and the total number of losses for all transmitted and received packets across packet groups, and judge presence of congestion from the ratio of the posterior losses to the total number of losses. FIG. 21 illustrates an example of complied results of congestion judgment. In FIG. 21, the total number of obtained packets that are transmitted from a transmitting terminal of interest, the number of losses out of the total number, the number of posterior losses, and congestion judgment are compiled for each transmitting terminal identified by an IP address. The number of posterior losses is the number of losses that occur at positions posterior to the given position in a packet group. In this way, results of congestion judgment are compiled by source IP address and presence/absence of congestion is analyzed for each address layer. The results of compilation illustrated in FIG. 21 show that congestion is occurring on three terminals that are in communication and the terminals are affected by the congestion in a subnet the network portion of whose addresses is 10.10.10. Meanwhile, it can be seen that the subnet with the network portion in its address being 20.20.20 is not affected by congestion. It can therefore be determined that accesses are concentrating on a router for the subnet with the network portion of 10.10.10, causing congestion. The congestion detection apparatus 40 notifies given terminals or the like of the position where the congestion is occurring such as by mail. Upon being notified, an administrator can appropriately take action, such as checking the MIB of a router that needs to be handled or improving lines. When congestion is occurring only at the level of addresses of individual terminals, it can be determined that the congestion is occurring on the individual terminals, not on a router.

For a terminal that transmits a small number of packets, packet losses do not occur probabilistically and judgment of congestion cannot be performed. Thus, when position of congestion is to be identified, attention is paid only to those transmitting terminal that transmit packets more than a given number at least within a certain measurement period (e.g., one minute). By way of example, when 300 packets are transmitted at a packet loss rate of 1%, one packet loss occurs with a probability of 95% or higher. Therefore, only transmitting terminals that transmit 300 or more packets are paid attention.

Also, when congestion is occurring on a certain percentage, e.g., 70% or more, of transmitting terminals that transmit packets more than a given number in a subnet, the congestion is determined to be occurring on the router for that subnet. On the other hand, when congestion is occurring on terminals less than the given percentage, it is determined that a failure is occurring on the individual terminals.

(6) Flow of Processing

Now, an example flow of processing performed on the congestion detection apparatus 40 will be described using FIGS. 22 to 25.

Figure 22:
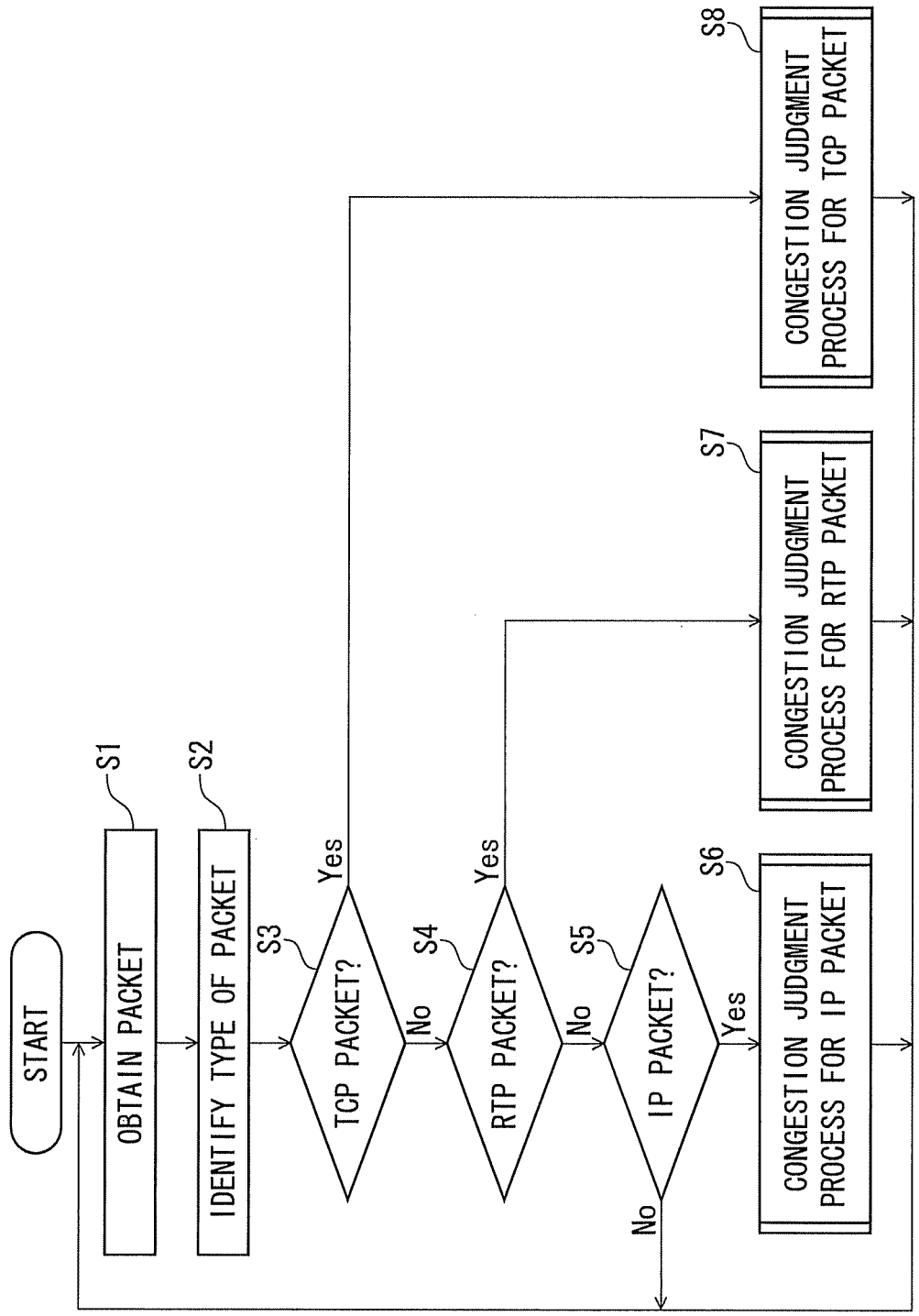
FIG. 22 illustrates an example of an operation chart that illustrates the overall flow of processing on the congestion detection apparatus.

FIG. 22 illustrates an example of an operation chart illustrating the overall flow of processing on the congestion detection apparatus 40.

When packets are transmitted and received between the server A and a terminal, the congestion detection apparatus 40 provided before the server A performs the following process.

In operation S1, the packet acquiring part 41 obtains transmitted and received packets from the network. The packet information acquiring part 42 detects the time at which each IP packet was acquired.

In operation S2, the packet information acquiring part 42 identifies the type of a packet with reference to the "type" field value contained in the Ethernet header of each packet, "protocol" field value in the IP header, and a value in the first two bits of data, and so forth.

In the operations S3 to S5, the flow proceeds to operation S8 when the packet is a TCP packet, to operation S7 when it is an RTP packet, and to operation S6 when it is neither a TCP nor RTP packet but an IP packet. When it is not a TCP, RTP, or IP packet, the flow returns to operation S1.

In operations S6 to S8, for a TCP packet, a congestion judgment process for a TCP packet is performed (operation S8), and for an RTP packet, a congestion judgment process for an RTP packet is performed (operation S7). When it is not a TCP or RTP packet but is an IP packet, a congestion judgment process for an IP packet is performed (operation S6).

Figure 23:
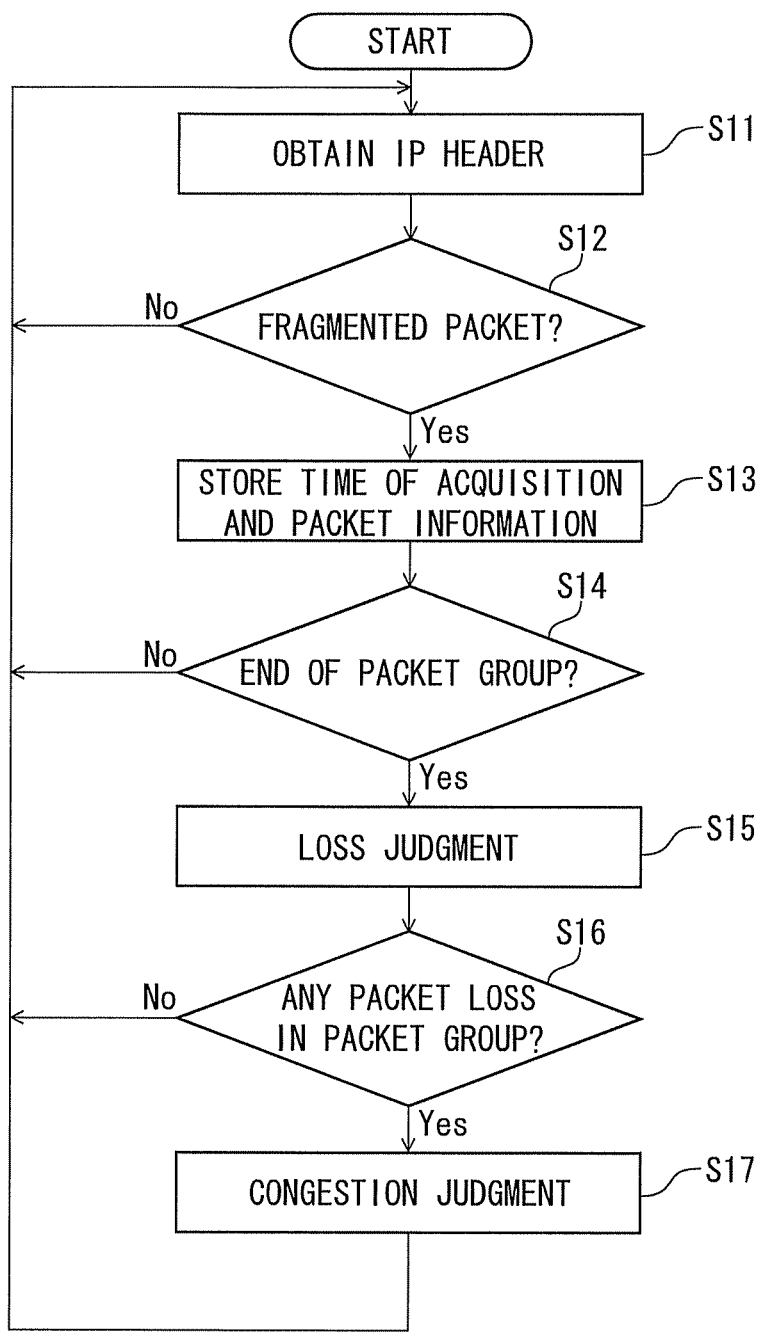
FIG. 23 illustrates an example of an operation chart that illustrates a congestion judgment process for an IP packet.

FIG. 23 illustrates an example of an operation chart illustrating the flow of a congestion judgment process for an IP packet.

In operation S11, the packet information acquiring part 42 obtains necessary information from the IP header.

In operations S12 and S13: the packet information DB 43 detects whether the IP packet is fragmented by checking the flag and fragment offset (operation S12). If the IP packet is fragmented, it stores packet information such as the time at which each IP packet was acquired, the source IP address, identifier, flag, fragment offset, and packet length (operation S13).

In operation S14, the packet group extracting part 45 extracts IP packet ranging from one that has a fragment offset of "0" to one that has a flag of "no more fragment" as one packet group, from IP packets having the same identifier. If IP packets have been obtained to the last one of the packet group, the flow proceeds to operation S15. Otherwise, the flow returns to operation S11, where the IP header of the next packet is obtained. Whether an IP packet is the last packet of the packet group can be determined from the flag of the IP packet being "no more fragment", from the packet length being smaller than the maximum byte length, from the next IP packet having not been obtained after elapse of a given time period after acquisition of the last IP packet or the like.

In operation S15, the packet loss detecting part 44 makes reference to the packet information DB 43 and compares the sum (offset(k)+length(k)) of the previous IP packet with the fragment offset (offset(k+1)) of the subsequent IP packet to determine whether there is a packet loss.

In operation S16, if there is a packet loss in the extracted packet group, the operation flow proceeds to operation S17, otherwise, returns to operation S11.

In operation S17, the congestion judging part 46 performs judgment of congestion according to any one judgment method and locates the position of the congestion.

Figure 24:
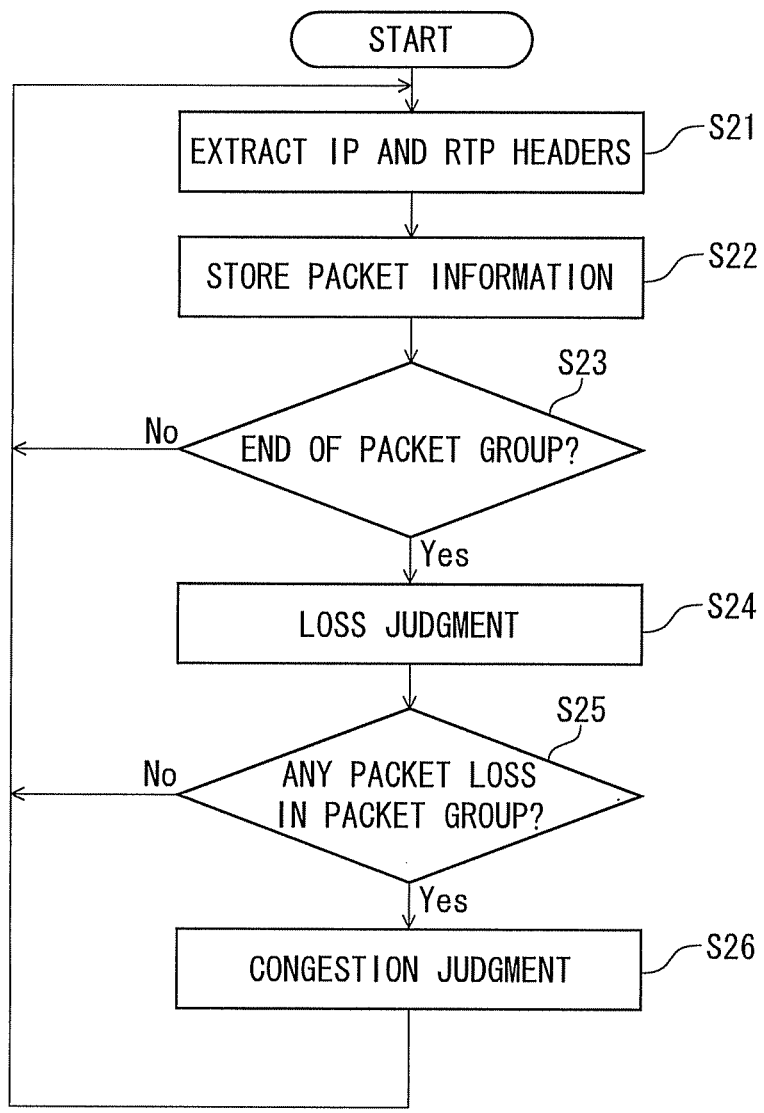
FIG. 24 illustrates an example of an operation chart that illustrates a congestion judgment process for an RTP packet.

FIG. 24 illustrates an example operation chart illustrating the flow of congestion judgment process for an RTP packet.

In operation S21, the packet information acquiring part 42 obtains the source IP address, packet length, originating port number, timestamp, and sequence number, for example, from headers.

In operation S22, the packet information DB 43 stores packet information such as the time at which each RTP packet was acquired and information extracted from headers.

In operation S23, the packet group extracting part 45 extracts a packet group based on possession of the same timestamp or continuity of sequence numbers. If RTP packets have been obtained to the last one of the packet group, the flow proceeds to operation S24. Otherwise, the flow returns to operation S21, where the headers of the next packet are obtained. Whether an RTP packet is the last packet in a packet group can be determined from acquisition of a packet having a different timestamp or the like.

In operation S24, the packet loss detecting part 44 makes reference to the packet information DB 43 to detect any packet loss based on missing of sequence numbers.

In operations S25 and S26, if there is a packet loss, the flow proceeds to operation S26, where the congestion judging part 46 performs congestion judgment. If there is no packet loss, the flow returns to operation S21.

Figure 25:
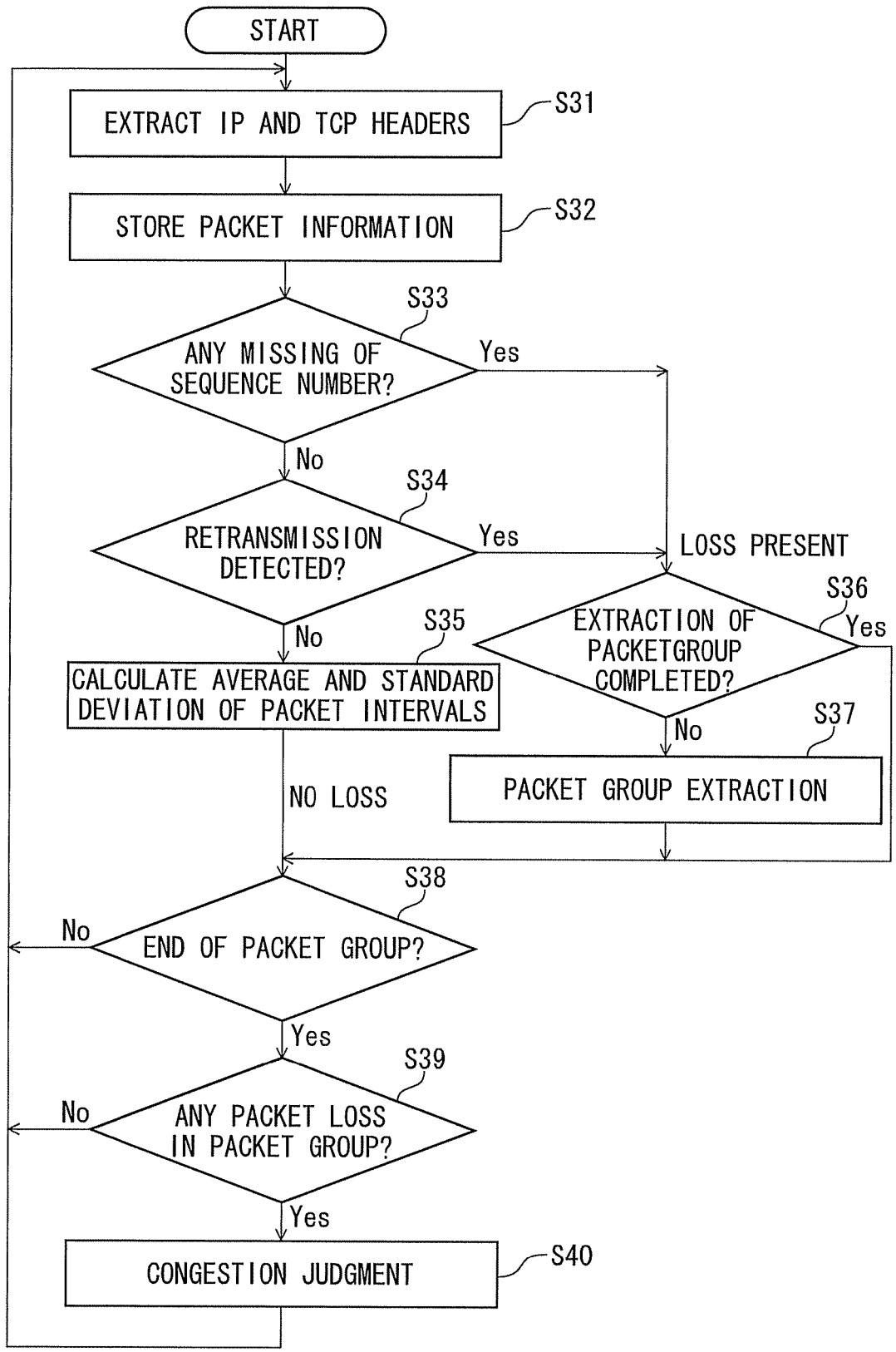
FIG. 25 illustrates an example of an operation chart that illustrates a congestion judgment process for a TCP packet.

FIG. 25 illustrates an example of an operation chart illustrating the flow of a congestion judgment process for a TCP packet.

In operations S31 and S32, the packet information acquiring part 42 obtains the source and destination IP addresses, source and destination port numbers, and sequence number, for example, from a TCP packet that contains data. The packet information acquiring part 42 also obtains the source and destination IP addresses, the source and destination port numbers, and an ACK number from a TCP packet as an ACK, and counts the number of times an ACK number has been obtained (operation S31). The packet information DB 43 stores packet information, such as the time at which each TCP packet was obtained and information extracted from headers (operation S32).

In operation S33, the packet loss detecting part 44 makes reference to the packet information DB 43 to detect any missing of sequence numbers. If there is missing of a sequence number, the packet loss detecting part 44 determines that there is a packet loss and proceeds to operation S36, and if there is no missing, it proceeds to operation S34. Through this process, it is detected whether TCP packets had been lost before they reached the congestion detection apparatus 40.

In operation S34, the packet loss detecting part 44 judges whether there has been any retransmission though there is no missing of sequence numbers. Whether retransmission was performed or not is judged from overlapping storage of the same sequence number and the count value of ACK numbers being equal to or greater than a given value. With this process, a packet loss can be detected even when TCP packets were lost after reaching the congestion detection apparatus 40. If retransmission was performed, it is determined that there is a packet loss and the flow proceeds to operation S36. If no retransmission was performed, the flow proceeds to operation S35.

In operation S35 since there is no packet loss, the packet information acquiring part 42 calculates packet intervals from times of TCP packet acquisition as well as the average value and the standard deviation of the packet intervals.

In operations S36 and S37: if extraction of a packet group is not completed, the flow proceeds to operation S37, where a packet group is extracted based on where the packet loss has occurred. On the other hand, if extraction of a packet group is already completed, the flow proceeds to operation S38.

If there is missing of sequence numbers at operation S33, TCP packets had been lost before they reached the congestion detection apparatus 40. Therefore, the number of packets in the packet group G1 in which the packet loss has occurred is first determined based on the number of packets in packet group G0 which precedes the packet group G1. Then, the packet composition of the packet group G1 is identified based on the number of packets determined. It is preferable that no packet loss has occurred in the packet group G0.

If a packet loss is detected from retransmission at operation S34, TCP packets have been lost after they reached the congestion detection apparatus 40. Thus, the packet composition of the packet group G1 is identified based on packet intervals in the packet group G1 in which the packet loss has occurred.

In operation S38, if TCP packets have been obtained to the last one of the packet group, the flow proceeds to operation S39. Otherwise, the flow returns to operation S31, where the headers of the next TCP packet are obtained.

In operations S39 and S40: if there is a packet loss in the packet group, the flow proceeds to operation S40, where the congestion judging part 46 performs judgment of congestion. If there is no packet loss, the flow returns to operation S31.

According to the present embodiment described above, there is no necessity to separately transmit a measurement packet for detecting congestion because it judges congestion by detecting packets transmitted on a network. It is accordingly possible to perform congestion judgment without burdening the network, such as congesting the network with transmission of a measurement packet.

Congestion refers to a condition in which a network is overloaded with increase in communication traffic, and packets are discarded in order to avoid congestion when congestion has occurred. When packets are transmitted as a sequence from the transmitting terminal to the receiving terminal, congestion is likely to occur at a posterior point in the packet group and packets in the posterior point are likely to be discarded. The congestion detection method described above can detect congestion more accurately and prevent false detection because it references the position of a packet loss in a packet group when judging whether there is congestion or not.

The length of a segment in which a series of packets are transmitted is set to be shorter than Round Trip Time (RTT) in TCP, for example. The congestion detection method can perform congestion judgment in real time because it uses such a segment in which packets are continuously transmitted to judge whether there is congestion or not.

Packet group extraction and packet loss detection may be performed in any order. In other words, a packet group may be extracted based on obtained packets and then the position of a packet loss in the packet group may be located. Alternatively, the position of a packet loss may be first located and thereafter the packet group containing the packet loss may be extracted based on obtained packets.

Other Embodiments (a) Variation 1

The congestion judgment processes for IP and RTP packets described above extract a packet group and then detect any packet loss in the packet group as illustrated in FIGS. 23 and 24. In this variation, however, a packet loss may be detected and thereafter only a packet group that contains the position of the packet loss may be extracted.

In the IP packet example of the above-described embodiment, for example, the packet loss detecting part 44 detects loss of two packets between IP packets P7 and P10 based on packet information in the packet information DB 43 illustrated in FIG. 6. In variation 1, the packet group extracting part 45 receives the result of detection from the packet loss detecting part 44 and extracts IP packets that have the same identifier as the lost ones, as one packet group. For example, IP packets P7 and P10 are packets before and after the lost packets and have an identifier of "100" according to FIG. 6. IP packets P1 to P6 also have the identifier "100", and the fragment offset of IP packet P1 is "0", and the flag of IP packet P10 is "no more fragment". From these facts, the packet group extracting part 45 considers that the IP packets P1 to P10 are transmitted as a sequence and extracts them as a packet group G.

In this way, by extracting only packet groups in which a packet loss has occurred, it is possible to reduce extraction of packet groups and the amount of processing on the congestion detection apparatus.

Similar processing can be applied to the RTP packet example of the above-described embodiment. The packet group extracting part 45 extracts RTP packet that have the same timestamp as the lost packets as one packet group based on the result of packet loss detection by the packet loss detecting part 44 and the packet information in the packet information DB 43 illustrated in FIG. 8. For example, RTP packets P7 and P10 are packets that are positioned before and after the lost packets and have a timestamp of "100" from FIG. 8. RTP packets P1 to P6 have also the timestamp of "100". On the other hand, RTP packet P0 has a timestamp of "50", but RTP packets P0 and P1 have consecutive sequence numbers S0 and S1. Also, the timestamp changes to "200" from RTP packet P11 but RTP packets P10 and P11 have consecutive sequence numbers S10 and S11. From these facts, the RTP packets P1 through P10 are considered to be transmitted as a sequence and are extracted as a packet group G.

Conversely, the congestion judgment process for a TCP packet described above first detects any packet loss and then extracts a packet group in which the packet loss has occurred, as illustrated in FIG. 25. However, a packet group may be first extracted and then any packet loss in the packet group may be extracted. That is to say, regardless of whether there is a packet loss or not, a packet interval is compared with a given value every time a packet interval is obtained, and when the interval is greater than the given value, that position is determined to be a boundary between packet groups, and a packet group is always extracted. And every time one packet group has been extracted, any packet loss in that packet group is detected.

(b) Variation 2

In the above-described embodiment, the packet group extracting part 45 holds a rule of change in the number of packets between packet groups for a case there is no packet loss. Accordingly, when a packet loss has occurred in the preceding packet group out of neighboring packet groups, it is unknown how many packets will be transmitted in the next packet group. When a packet group cannot be extracted in such a situation, the position of the packet loss cannot be correctly located and congestion cannot be accurately judged, thus judgment of congestion may not be conducted.

(c) Variation 3

For extraction of a packet group from TCP packets in the above-described embodiment, the packet group extracting part 45 previously holds the rule of change in the number of packets between neighboring packet groups. However, the packet group extracting part 45 may also reference packet information in the packet information DB 43 to obtain a rule of change in the number of packets between packet groups that is defined by the transmitting terminal. For example, when no packet loss has occurred in the preceding packet group, it is detected by how many packets the next packet group increases its packets over the preceding packet group. If a packet loss has occurred in the preceding packet group, it is detected by how many packets the next packet group decreases its packets over the preceding packet group. The packet group extracting part 45 extracts a packet group based on this rule of change.

(d) Variation 4

While the above-described embodiment provides the congestion detection apparatus 40 separately from server A, it is also possible to integrate the congestion detection apparatus 40 into server A. The congestion detection apparatus 40 may also be integrated into terminals or a relay apparatus.

(e) Variation 5

A system that carries out the congestion detection method described above, a computer program for causing a computer to carry out the congestion detection method, and a computer-readable recording medium having the program recorded thereon are encompassed within the scope of the present invention. The computer-readable recoding medium may be a flexible disk, hard disk, CD-ROM (Compact Disc Read-Only Memory), MO (Magneto Optical disk), DVD (Digital Video Disk), DVD-ROM, DVD-RAM (DVD-Random Access Memory), BD (Blue-ray Disk), semiconductor memory, for example. The computer program is not limited to one recorded on such a recording medium and the computer program may be transmitted via an electrical communication line, a wireless or wired communication line, a network represented by the Internet, or the like.

According to an aspect of the embodiments of the invention, any combinations of the described features, functions, operations, and/or benefits can be provided. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the congestion detection device 40, relay device A, terminals, servers, etc.) comprises a controller (CPU) (e.g., a hardware logic circuitry based computer processor that processes or executes instructions, namely software/program), computer readable recording media, transmission communication media interface (network interface), and/or a display device, all in communication through a data communication bus. The results produced can be displayed on the display. A program/software implementing the embodiments may be recorded on computer computer-readable recording media. The program/software implementing the embodiments may also be included/encoded as a data signal and transmitted over transmission communication media. A data signal moves on transmission communication media, such as the wired network or the wireless network, for example, by being incorporated in a carrier wave. However, the data signal may be transferred not by the carrier wave described above but as a so-called baseband signal. Such a carrier wave is transmitted in an electrical, magnetic or electromagnetic form, or an optical, acoustic or any other form.

All examples and conditional language recited herein are intended for pedagogical purposes to aid the reader in understanding the invention and the concepts contributed by the inventor to furthering the art, and are to be construed as being without limitation to such For example recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A congestion detection method for causing a computer to function as a congestion detection apparatus connectable to a network, the congestion detection method comprising:
   obtaining packets on the network;
   extracting a packet group made up of a series of packets based on the obtained packets;
   detecting a packet loss in the packet group and locating a temporal position within the packet group where the packet loss is occurring, wherein the temporal position indicates an order of a packet that the packet loss occurred when the packet group is transmitted as a sequence; and
   judging whether congestion is occurring based on the temporal position within the packet group where the packet loss is occurring, wherein
      the judging includes judging that congestion is occurring if the temporal position of the lost packet in the packet group is a position temporally posterior to a reference position in the packet group, and
      the reference position is any position, in terms of packet obtaining time in the obtaining of the packets on the network, in the packet group from a center position in the packet group to a position in a latter half portion.

2. The congestion detection method according to claim 1, wherein the judging includes judging that congestion is occurring if a number of packet losses at positions temporally posterior to the reference position in the packet group is greater than a number of packet losses at positions temporally anterior to the reference position.

3. The congestion detection method according to claim 1, wherein
   the judging includes statistically estimating a confidence interval of a population mean of loss rates using a packet loss rate and a number of packets in an anterior portion temporally anterior to the reference position in the packet group, setting an upper limit value of the estimated confidence interval as a threshold A, and judging that congestion is occurring if the packet loss rate in a posterior portion temporally posterior to the reference position in the packet group is greater than the threshold value A.

4. The congestion detection method according to claim 3, wherein when the estimated confidence interval is 95% (0.95) the judging includes obtaining the threshold value A according to either Formula (2) or (3):

$$\text{threshold value } A = L_f + 1.96\sqrt{L_f(L - L_f)/N} \; (Lf \neq 0) \quad (2)$$

$$\text{threshold value } A = 1 - (0.95)^{1/N} \; (Lf = 0) \quad (3)$$

where Lf+a value for the estimated confidence interval is the packet loss rate in the anterior portion and N is the number of packets in the anterior portion.

5. The congestion detection method according to claim 1, wherein the judging includes:
   assigning a packet position number that indicates a temporal order to each of the packets within the packet group;

calculating an average value of the packet position number corresponding to the temporal position where the packet loss is occurring; and judging that the congestion is occurring when the average value of the packet position number is larger than a threshold value which indicates the latter half position.

6. The congestion detection method according to claim 1, wherein upon detecting that original data has been divided into a plurality of packets, the extracting includes extracting the plurality of packets as the packet group.

7. The congestion detection method according to claim 1, wherein the extracting includes comparing packet intervals which are time intervals at which each of the packets is obtained with a reference value, and extracts the packet group based on results of comparison.

8. The congestion detection method according to claim 7, wherein the reference value is a value that is decided based on an average value of the packet intervals.

9. The congestion detection method according to claim 8, wherein the reference value is a value that is decided based on the average value of the packet intervals and a standard deviation of the packet intervals.

10. The congestion detection method according to claim 1, wherein the extracting includes storing a rule of change for change in a number of packets in the packet group, determining the number of packets in a packet group in which a packet loss has occurred based on a number of packets in a packet group in which no packet loss has occurred and the rule of change, and extracting a packet group in which a packet loss has occurred based on the determined number of packets.

11. The congestion detection method according to claim 1, wherein
the judging includes locating a network position where congestion is occurring on the network by compiling results of congestion judgment for each of addresses of terminals that transmitted the packets and analyzing presence/absence of congestion for each layer of the addresses.

12. A congestion detection method comprising:
detecting one or more packet losses in a series of packets transmitted via a network; and
detecting, by a computer, an occurrence of congestion when distribution of each temporal position of the one or more packet losses within the series of packets, wherein a temporal position indicates an order of a packet that the packet loss occurred when the packet group is transmitted as a sequence, is biased toward a later part in the series of packets,
judging whether congestion is occurring based on the temporal position within the packet group where the packet loss is occurring, wherein
the judging includes judging that congestion is occurring if the temporal position of the lost packet in the packet group is a position temporally posterior to a reference position in the packet group, and
the reference position is any position, in terms of packet obtaining time in the obtaining of the packets on the network, in the packet group from a center position in the packet group to a position in a latter half portion.

13. A congestion detection apparatus comprising:
a computer processor that executes a procedure including:
detecting one or more packet losses in a series of packets transmitted via a network; and
detecting an occurrence of congestion when distribution of each temporal position of the one or more packet losses in the series of packets, wherein a temporal position indicates an order of a packet that the packet loss occurred when the packet group is transmitted as a sequence, is biased toward a later part in the series of packets,
judging whether congestion is occurring based on the temporal position within the packet group where the packet loss is occurring, wherein
the judging includes judging that congestion is occurring if the temporal position of the lost packet in the packet group is a position temporally posterior to a reference position in the packet group, and
the reference position is any position, in terms of packet obtaining time in the obtaining of the packets on the network, in the packet group from a center position in the packet group to a position in a latter half portion.

* * * * *

UNITED STATES PATENT AND TRADEMARK OFFICE
CERTIFICATE OF CORRECTION

PATENT NO. : 8,593,947 B2  
APPLICATION NO. : 12/410099  
DATED : November 26, 2013  
INVENTOR(S) : Hideaki Miyazaki It is certified that error appears in the above-identified patent and that said Letters Patent is hereby corrected as shown below:

In the Claims

In Column 22, Lines 57-58, In Claim 4, delete " $L_f + 1.96\sqrt{L_f(L-L_f)/N}\ (Lf \neq 0)$ " and insert -- $L_f + 1.96\sqrt{L_f(1-L_f)/N}\ (Lf \neq 0)$ --, therefor.

Signed and Sealed this  
Eleventh Day of February, 2014

Michelle K. Lee  
*Deputy Director of the United States Patent and Trademark Office*